(12) United States Patent
Kubo et al.

(10) Patent No.: US 10,885,940 B2
(45) Date of Patent: Jan. 5, 2021

(54) DISC STORAGE DEVICE RACK AND DISC ARCHIVE DEVICE

(71) Applicant: SONY SEMICONDUCTOR SOLUTIONS CORPORATION, Kanagawa (JP)

(72) Inventors: Takeshi Kubo, Kanagawa (JP); Naofumi Goto, Kanagawa (JP)

(73) Assignee: SONY SEMICONDUCTOR SOLUTIONS CORPORATION, Kanagawa (JP)

(*) Notice: Subject to any disclaimer, the term of this patent is extended or adjusted under 35 U.S.C. 154(b) by 0 days.

(21) Appl. No.: 16/647,900

(22) PCT Filed: Aug. 10, 2018

(86) PCT No.: PCT/JP2018/030078
§ 371 (c)(1),
(2) Date: Mar. 17, 2020

(87) PCT Pub. No.: WO2019/064963
PCT Pub. Date: Apr. 4, 2019

(65) Prior Publication Data
US 2020/0219537 A1 Jul. 9, 2020

(30) Foreign Application Priority Data

Sep. 26, 2017 (JP) .................. 2017-184735

(51) Int. Cl.
*G11B 17/22* (2006.01)
*G11B 23/03* (2006.01)
*G11B 15/68* (2006.01)

(52) U.S. Cl.
CPC ........ *G11B 23/0313* (2013.01); *G11B 15/682* (2013.01); *G11B 15/6825* (2013.01);
(Continued)

(58) Field of Classification Search
None
See application file for complete search history.

(56) References Cited

U.S. PATENT DOCUMENTS

| 4,850,485 A * | 7/1989 | Ishikawa ............ G11B 23/0236 211/40 |
| 5,021,902 A * | 6/1991 | Ishikawa ............ G11B 15/681 360/91 |

(Continued)

FOREIGN PATENT DOCUMENTS

| CN | 107077869 A | 8/2017 |
| JP | 2000-327066 A | 11/2000 |

(Continued)

OTHER PUBLICATIONS

International Search Report and Written Opinion of PCT Application No. PCT/JP2018/030078, dated Sep. 18, 2018, 09 pages of ISRWO.

*Primary Examiner* — William J Klimowicz
(74) *Attorney, Agent, or Firm* — Chip Law Group

(57) ABSTRACT

A disc storage device rack includes: an accommodation space surrounded by left and right side plates and upper and lower partition plates and configured to accommodate a disc storage device; a guide portion provided on the side plates and configured to fit to a guided unit provided in the disc storage device to guide a sliding operation of the disc storage device; and a shutter provided on each end surface of the side plates so as to be slidable in an up-and-down direction and configured to open an opening of the guide portion when the disc storage device is pulled out from the accommodation space or when the disc storage device is pushed into the accommodation space.

8 Claims, 40 Drawing Sheets

(52) U.S. Cl.
    CPC ........ *G11B 15/6835* (2013.01); *G11B 17/225* (2013.01); *G11B 17/228* (2013.01)

(56) References Cited

U.S. PATENT DOCUMENTS

| | | | |
|---|---|---|---|
| 8,723,058 B2* | 5/2014 | Yang | E05C 1/02 |
| | | | 174/543 |
| 10,510,372 B1* | 12/2019 | Bailey | G11B 15/67502 |
| 10,624,230 B2* | 4/2020 | Chen | H05K 7/1489 |
| 2012/0286633 A1* | 11/2012 | Hashimoto | G11B 15/6835 |
| | | | 312/215 |
| 2017/0229144 A1 | 8/2017 | Sekine et al. | |
| 2019/0090376 A1* | 3/2019 | Kho | H05K 7/1495 |
| 2020/0107465 A1* | 4/2020 | Marrs | H05K 7/1489 |

FOREIGN PATENT DOCUMENTS

| | | |
|---|---|---|
| JP | 2008-186552 A | 8/2008 |
| JP | 2014-013639 A | 1/2014 |
| JP | 2016-091583 A | 5/2016 |
| WO | 2016/072055 A1 | 5/2016 |
| WO | 2016/208117 A1 | 12/2016 |

* cited by examiner

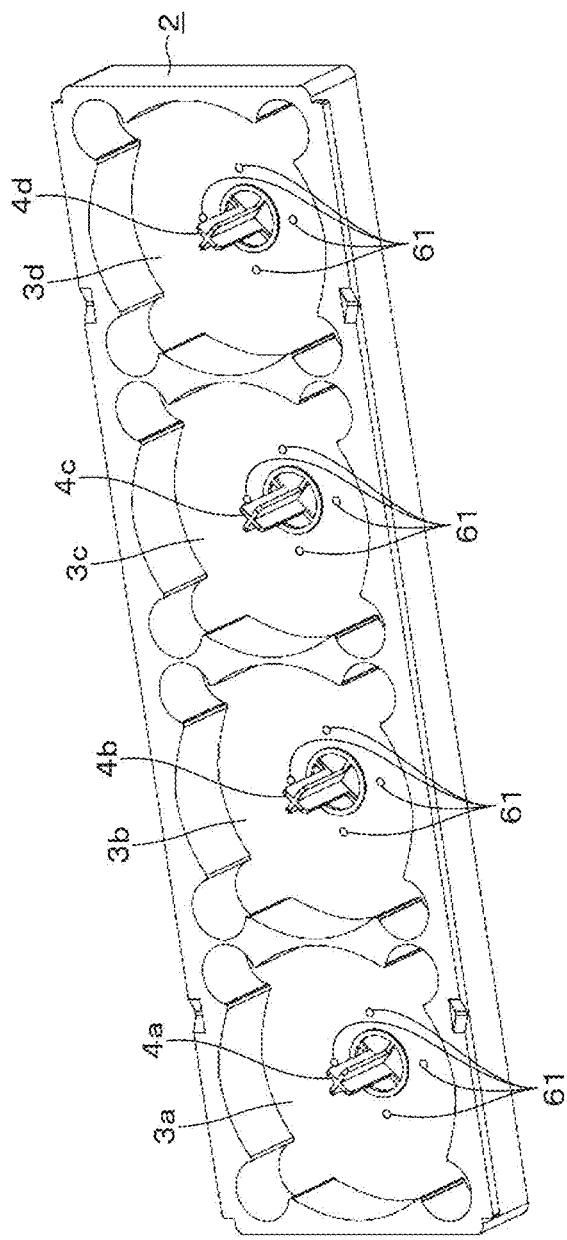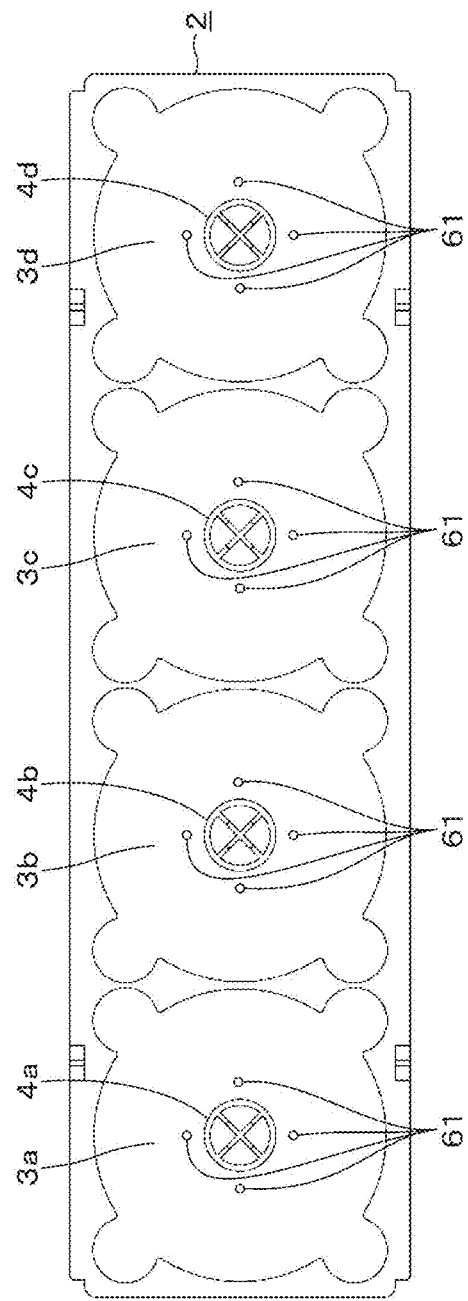

OPENED STATE

CLOSED STATE

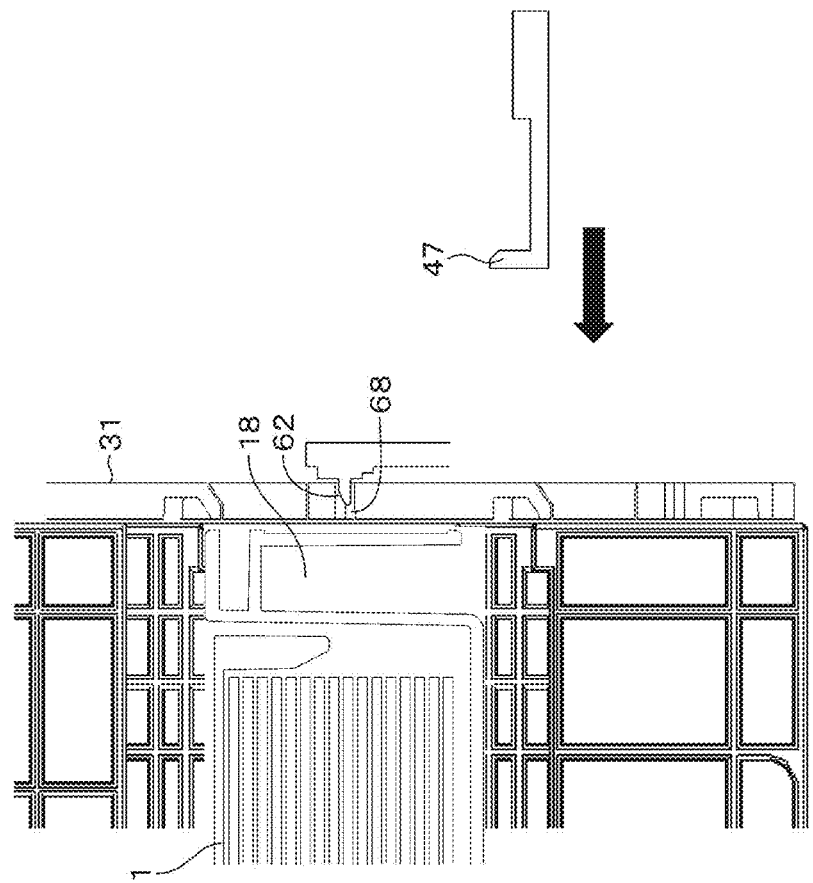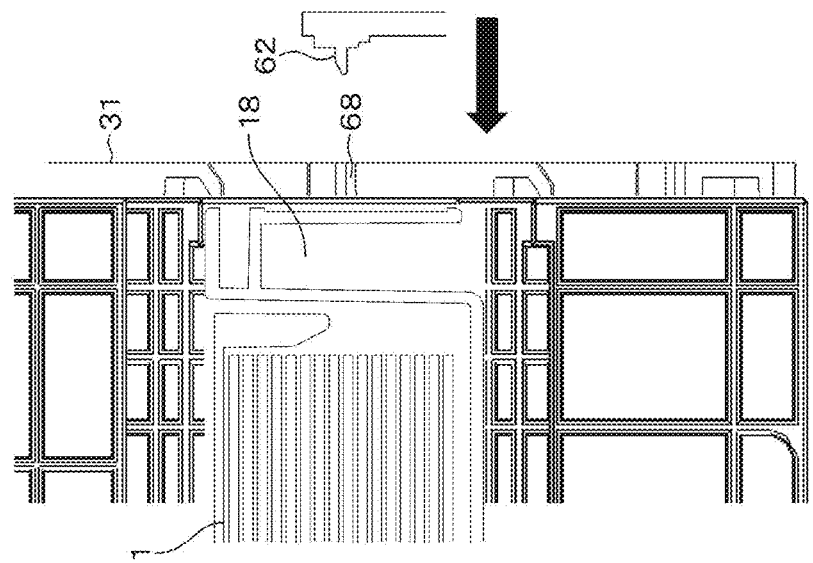

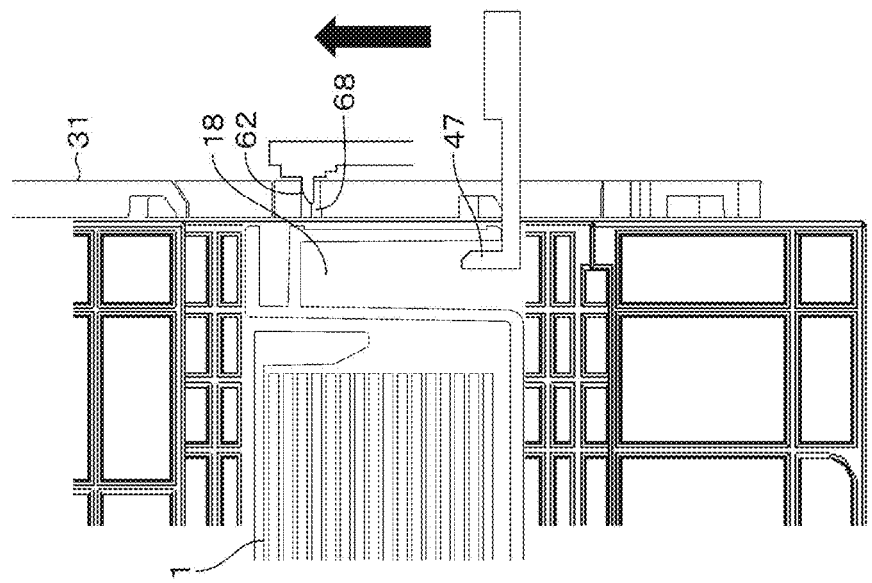
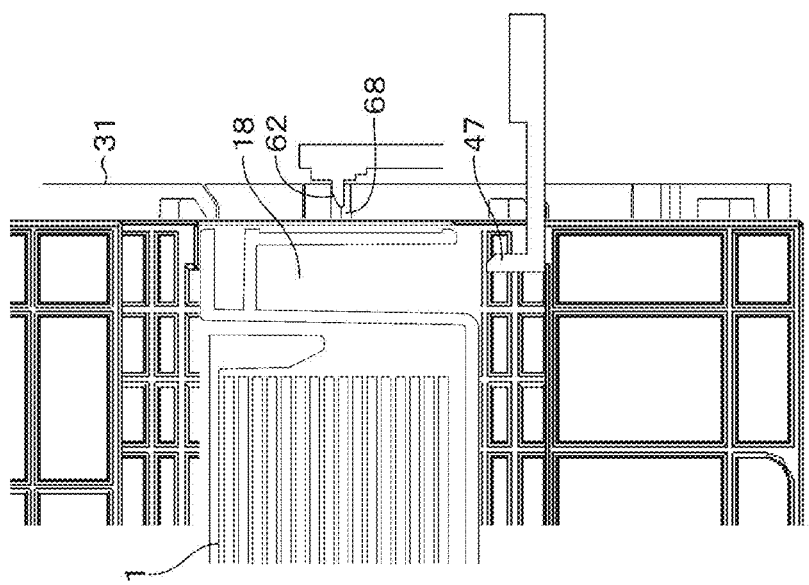

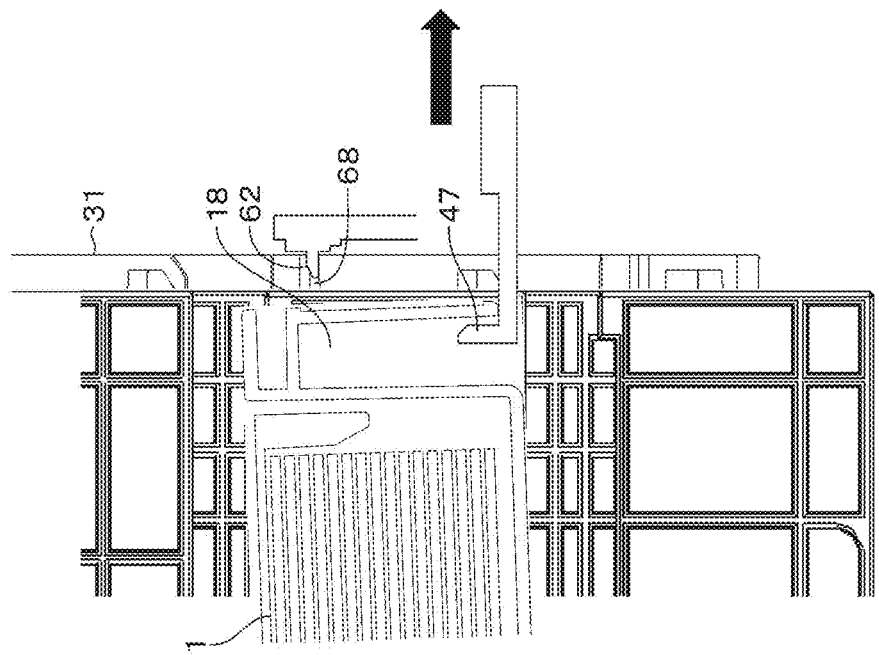
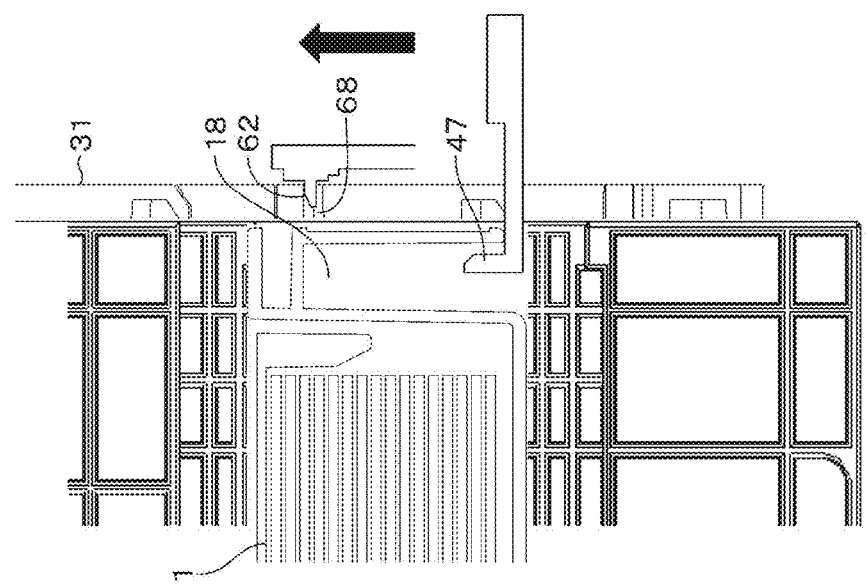

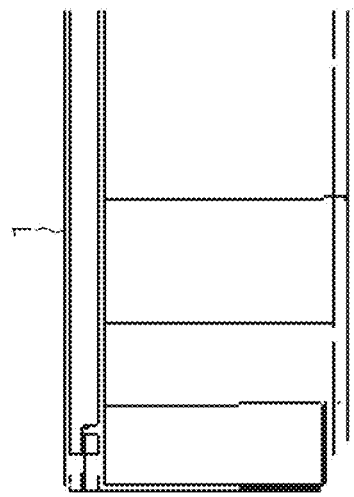
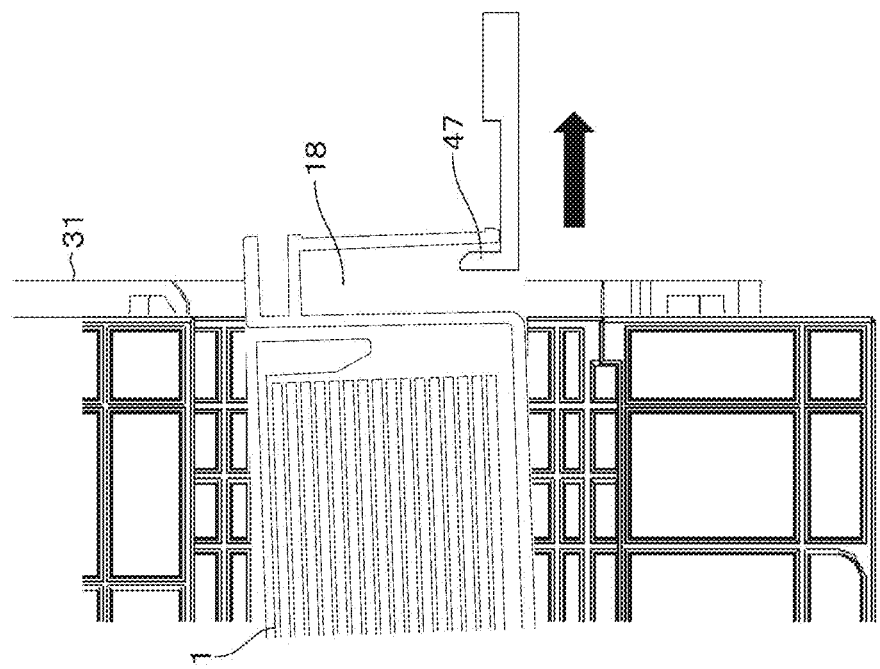

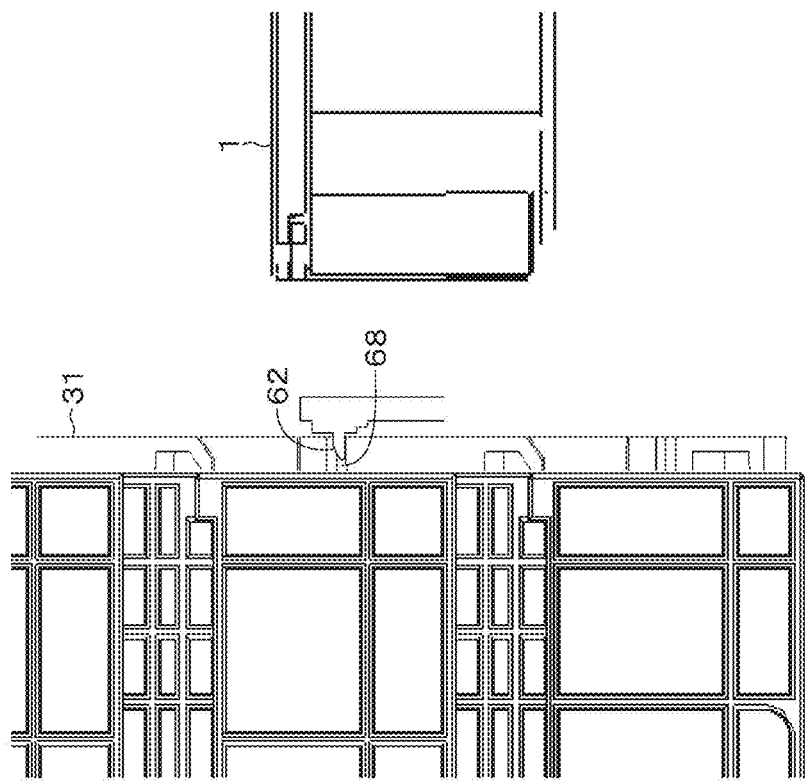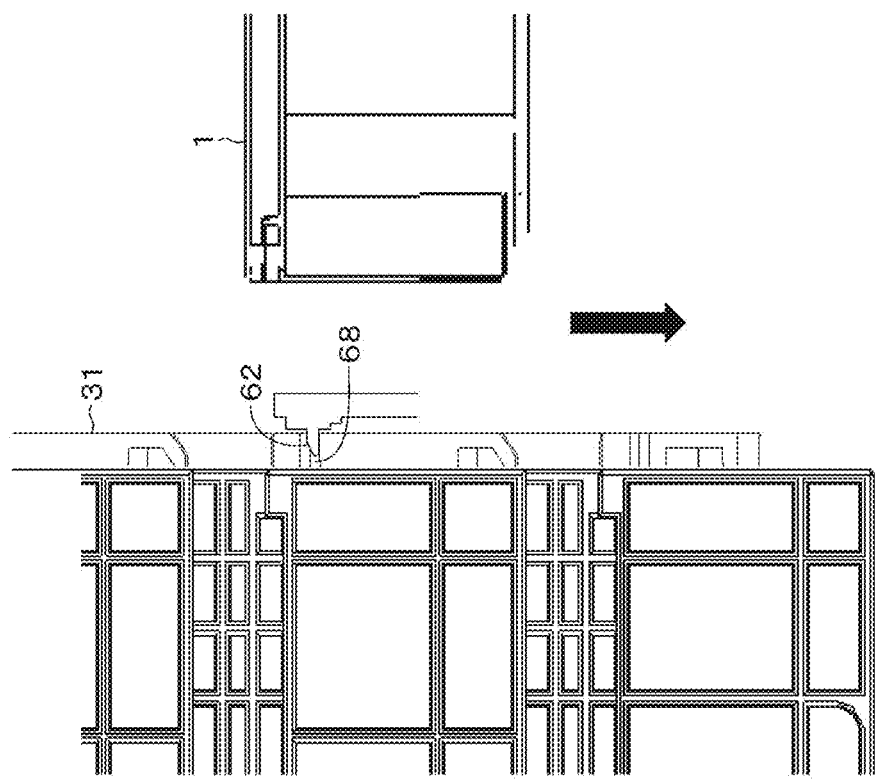

US 10,885,940 B2

DISC STORAGE DEVICE RACK AND DISC ARCHIVE DEVICE

CROSS REFERENCE TO RELATED APPLICATIONS

This application is a U.S. National Phase of International Patent Application No. PCT/JP2018/030078 filed on Aug. 10, 2018, which claims priority benefit of Japanese Patent Application No. JP 2017-184735 filed in the Japan Patent Office on Sep. 26, 2017. Each of the above-referenced applications is hereby incorporated herein by reference in its entirety.

TECHNICAL FIELD

The present technology relates to a disc storage device rack and a disc archive device using a large-capacity optical disc.

BACKGROUND ART

An archive device using a large-capacity optical disc (hereinafter, referred to as a "disc") has been put to practical use. Some storage devices in data centers use a magnetic tape as a medium. Discs are more suitable for cold archives for long-term storage than magnetic tapes. For example, Patent Document 1 listed below describes an archive device in which 12 discs are stored in a magazine and can be handled in units of a magazine.

As described in Patent Document 1, storing 12 discs in one magazine increases the number of discs that can be accessed at once as compared to mounting discs one by one in the drive, resulting in an advantage that larger data can be recorded or reproduced at once. However, in a data center, it is desired to record or reproduce a larger amount of data.

The applicant of the present application has previously proposed a disc medium storage device (hereinafter, appropriately referred to as a disc tray) in which a larger number of discs are stored in a case (see Patent Document 2). This disc tray is capable of storing 64 discs (4 rows×16 discs=64) in a box-shaped synthetic resin case having an open upper surface. A large number of such disc trays are accommodated in a dedicated storage rack (hereinafter, appropriately referred to as a tray rack), and a tray transport robot takes out a predetermined disc tray from the tray rack, transports the disc tray to a disc drive, and the disc drive simultaneously records or reproduces data with respect to a plurality of discs.

CITATION LIST

Patent Document

Patent Document 1: Japanese Patent Application Laid-Open No. 2014-13639
Patent Document 2: WO 2016/208117

SUMMARY OF THE INVENTION

Problems to be Solved by the Invention

If the disc tray stored in the tray rack falls from the tray rack due to vibration such as an earthquake, a large number of discs are scattered on the floor. Compared to a data archive device using a magnetic tape, one disc tray stores many discs, and each disc records a large amount of data. Therefore, the security of the user data is threatened more as compared to the case where a magnetic tape is used as a medium. Furthermore, since the disc tray is heavier than a magnetic tape cartridge, there has been a problem that the pop-out cannot be reliably prevented only by a pop-out prevention mechanism having a simple mechanism.

As an example, the weight of the magnetic tape cartridge is 280 g while the weight of the disc tray is 1.5 kg. There was a possibility that such a heavy disc tray cannot prevent the disc tray from popping out in the event of a large earthquake by using only a mechanism that catches the disc tray with an elastic claw including, for example, a resin material.

Therefore, an object of the present technology is to provide a disc storage device rack and a disc archive device that can reliably prevent a disc tray from popping out of a tray rack.

Solutions to Problems

The present technology is a disc storage device rack including:
an accommodation space surrounded by left and right side plates and upper and lower partition plates and configured to accommodate a disc storage device;
a guide portion provided on each of the side plates and configured to fit to a guided unit provided in the disc storage device to guide a sliding operation of the disc storage device; and
a shutter provided on each end surface of the side plates so as to be slidable in an up-and-down direction and configured to open an opening of the guide portion when the disc storage device is pulled out from the accommodation space or when the disc storage device is pushed into the accommodation space.

Furthermore, the present technology is a disc archive device including:
a disc storage device rack including an accommodation space surrounded by left and right side plates and upper and lower partition plates and configured to accommodate a disc storage device, a guide portion provided on each of the side plates and configured to fit to a guided unit provided in the disc storage device to guide a sliding operation of the disc storage device, and a shutter provided on each end surface of the side plates so as to be slidable in an up-and-down direction and configured to open an opening of the guide portion when the disc storage device is pulled out from the accommodation space or when the disc storage device is pushed into the accommodation space;
a transport robot arranged near the accommodation space of the disc storage device rack and configured to pull out the disc storage device from the accommodation space and push the disc storage device into the accommodation space; and
a disc drive having a plurality of drives for performing recording or reproduction on a disc-shaped recording medium in the disc storage device transported by the transport robot.

Effects of the Invention

According to at least one embodiment, it is possible to reliably prevent the disc tray from popping out even in a case where a large vibration or oscillation such as at the time of a large earthquake is applied to the tray rack. Note that effects described herein are not necessarily limited, but may also be any of those described in the present technology or those different therefrom. Furthermore, the contents of the

BRIEF DESCRIPTION OF DRAWINGS

FIGS. 5A and 5B are perspective views used for explaining a disc tray.

FIG. 34B is a partially enlarged view illustrating both an upper shutter and a lower shutter in a closed state.

FIGS. 36A and 36B are schematic diagrams used for explaining an operation of controlling a shutter.

FIGS. 37A and 37B are schematic diagrams used for explaining an operation of controlling a shutter.

FIGS. 38A and 38B are schematic diagrams used for explaining an operation of controlling a shutter.

FIGS. 39A and 39B are schematic diagrams used for explaining an operation of controlling a shutter.

FIGS. 40A and 40B are schematic diagrams used for explaining an operation of controlling a shutter.

MODE FOR CARRYING OUT THE INVENTION

Figure 1:
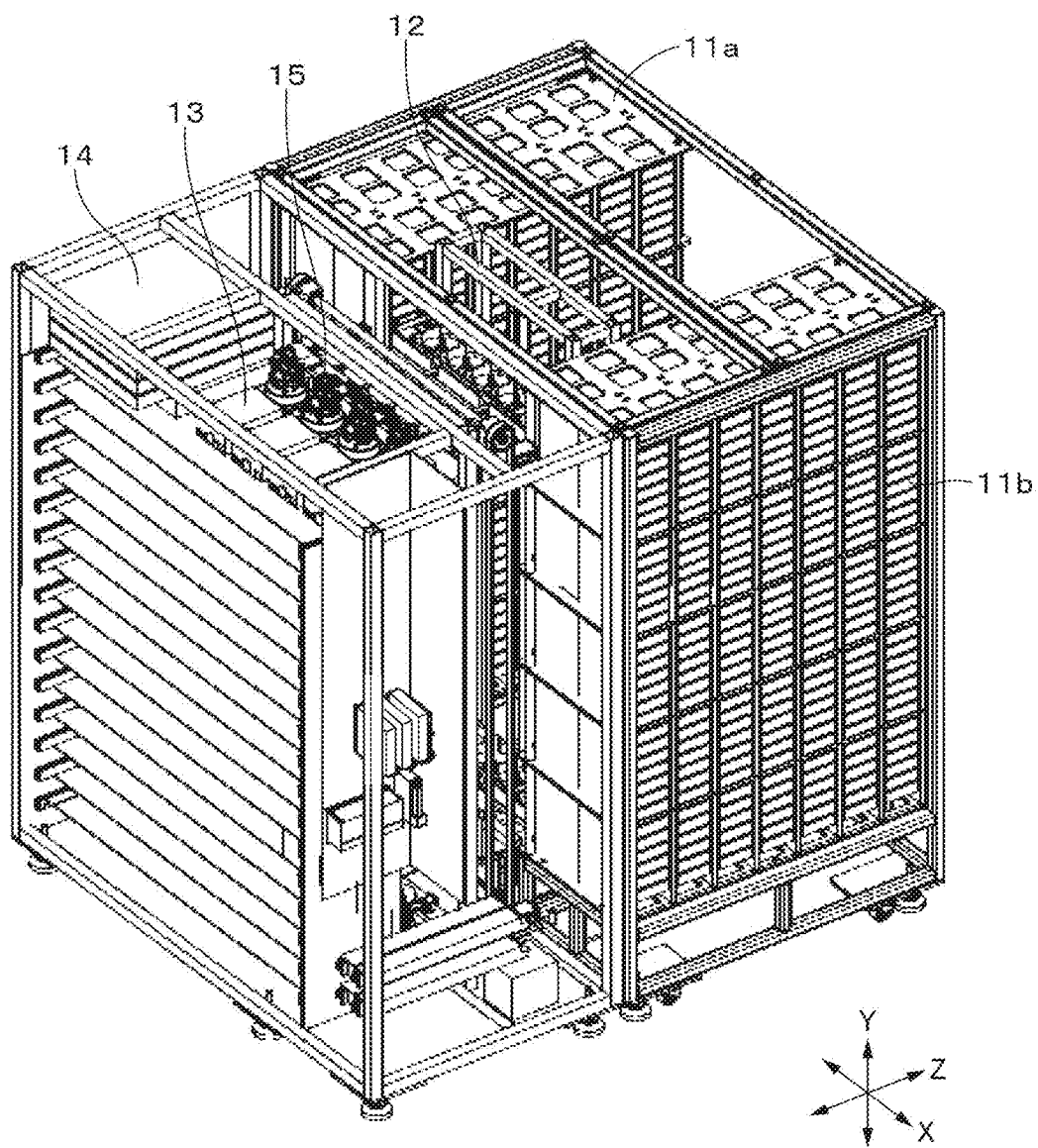
FIG. 1 is a perspective view illustrating an entire disc archive device.

Embodiments described below are preferred specific examples of the present technology, and various technically preferable limitations are given. However, the scope of the present technology is not limited to these embodiments unless otherwise specified to limit the present technology in the following description.

Note that description of the present technology is made according to the following order.

<1. Disc archive device to which the present technology can be applied>

<2. An embodiment of the present technology>

<3. Variation>

1. Disc Archive Device to Which the Present Technology can be Applied

A disc archive device to which the present technology can be applied will be described. This apparatus uses a large-capacity optical disc as a disc. For example, as the disc, a high-density optical disc such as a Blu-ray (registered trademark) disc (BD), and the like can be used. The BD is a high-density optical disc having a recording capacity of about 25 GB on a single-sided single layer and about 50 GB on a single-sided two-layer. In the BD standard, in order to reduce the beam spot diameter, the light source wavelength is set to 405 nm, and the numerical aperture numerical aperture (NA) of the objective lens is as large as 0.85. Moreover, in recent years, with respect to Blu-ray (registered trademark) disc (BD), the channel bit length, that is, the mark length, has been shortened, the density has been increased in the linear density direction, and a large capacity of 100 GB with three layers and 128 GB with four layers has been achieved to put BDXL (registered trademark) to practical use. Moreover, in order to further increase the recording capacity, there has been proposed a disc adopting a method of recording data on both a groove track and a land track (referred to as a land/groove recording method as appropriate). In this case, a larger capacity can be obtained.

"Overview of the Disc Archive Device"

The disc archive device according to an embodiment performs the processing roughly in the following order.

1. A large number of disc trays are stored in advance by an operator in a disc tray storage shelf (hereinafter, referred to as a disc tray rack).

2. A tray transport device (hereinafter, referred to as a tray transport robot) travels near the tray rack to search for a target disc tray and removes the disc tray from the tray rack, and the tray transport robot holds the tray.

3. The disc tray held by the tray transport robot is carried to a turntable, and the disc tray is placed on the turntable. Two disc trays can be set on the turntable.

4. A desired number of discs (for example, any number from 1 to 16) are taken out from one disc tray on the turntable by a disc transport unit (hereinafter, referred to as a disc transport picker).

5. The disc transport picker transports the desired number of discs to the vicinity of a disc drive. Discs are set one by one on a disc placement surface (hereinafter, referred to as a drive tray) of the disc drive. In this case, the lowermost disc held in the disc transport picker is set. A disc mounting device (hereinafter, referred to as a picker pusher) moves up and down through a center opening of the drive tray to take out one disc from the discs held by the disc transport picker and set it on the disc tray.

6. The disc tray is inserted into a main body of the disc drive. The disc drive performs an access operation (recording or reproducing operation) on the set disc. When the access operation is ended, the disc tray is ejected from the main body.

7. The disc transport picker is moved onto the disc tray. The disc on the disc tray is mounted on the disc transport picker by the picker pusher.

8. The disc on which the disc transport picker is mounted is transported onto the disc tray on the turntable and stored in the disc tray.

9. The turntable rotates and the tray transport robot places the disc tray.

10. The tray transport robot stores the disc tray in the original location of the tray rack.

"Overall Configuration of the Disc Archive Device"

Figure 2:
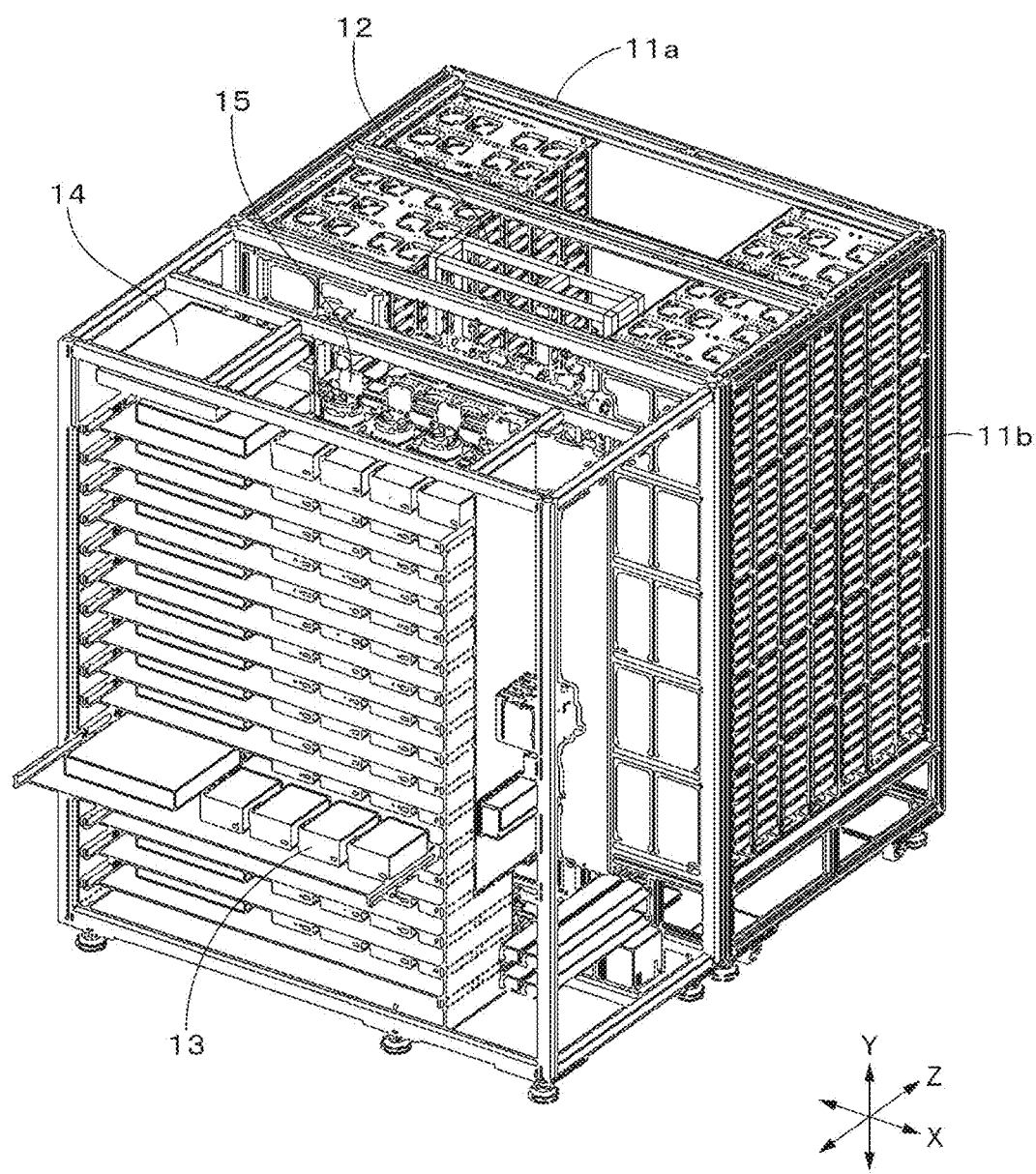
FIG. 2 is a perspective view illustrating an entire disc archive device.
Figure 3:
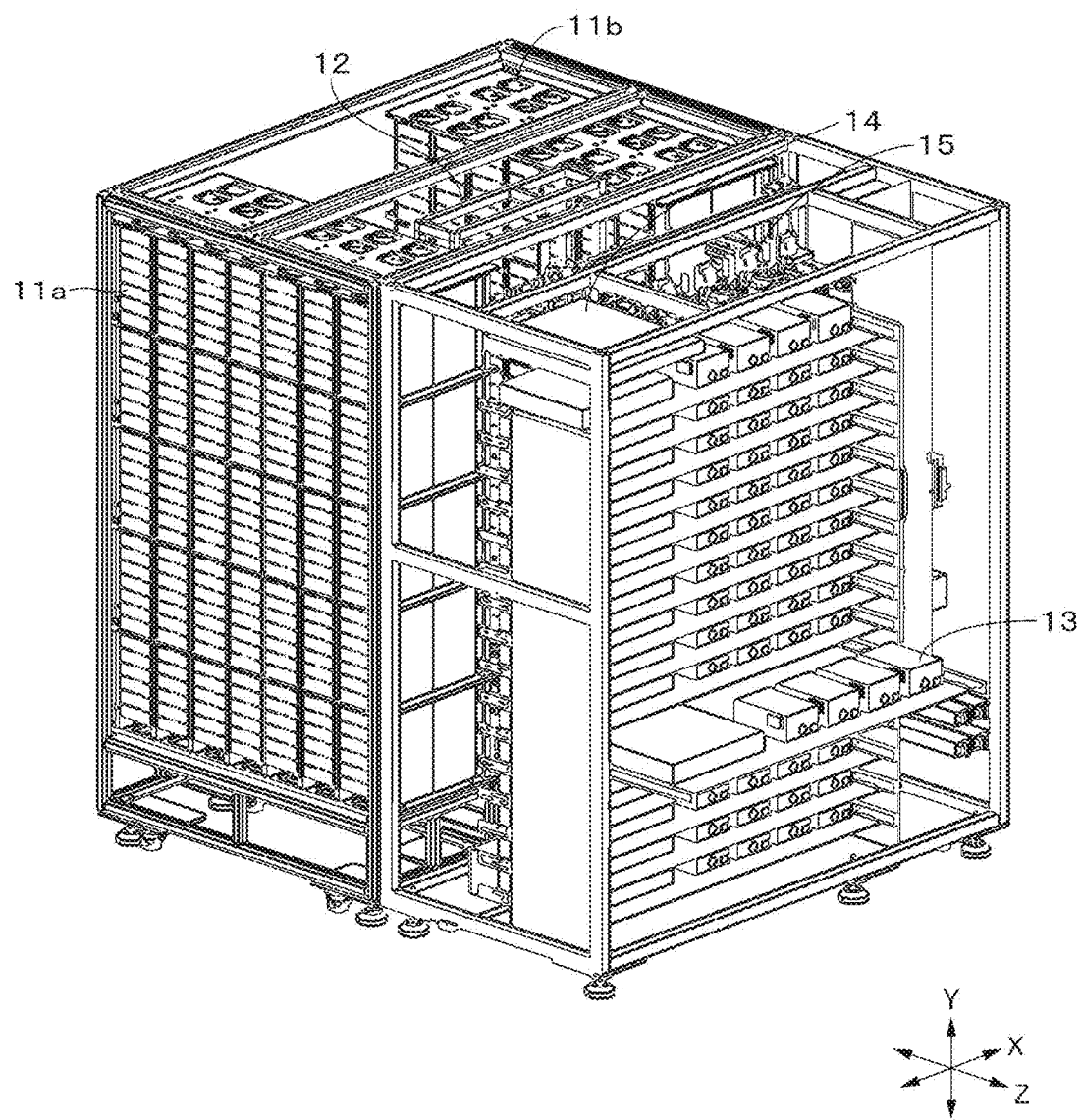
FIG. 3 is a perspective view illustrating an entire disc archive device.

FIG. 1, FIG. 2, and FIG. 3 are perspective views of the external appearance of the entire system of the disc archive device to which the present technology can be applied. The system mainly includes tray racks 11a and 11b, a tray transport robot 12, a disc drive 13, a controller for controlling the entire system, an electric circuit unit 14 including a power supply circuit, a disc transport picker 15, and a turntable 16. The configuration including one tray rack 11 is the minimum configuration, and the number of tray racks 11 can be increased by coupling the tray racks 11 in a Z direction.

A space in which the tray transport robot 12 travels is formed between the tray racks 11a and 11b facing each other. The tray transport robot 12 is guided by, for example, a lower trolley wire or a lower rail, and is traveled by a drive source such as an electric motor. It can be stopped at a desired position by a position sensor. Moreover, a barcode reader included in the tray transport robot 12 can read a barcode displayed on the surface of the case of the disc tray, and pulls out the specified disc tray from the tray rack 11a or 11b and transports it to the vicinity of the disc transport picker 15.

Figure 4:
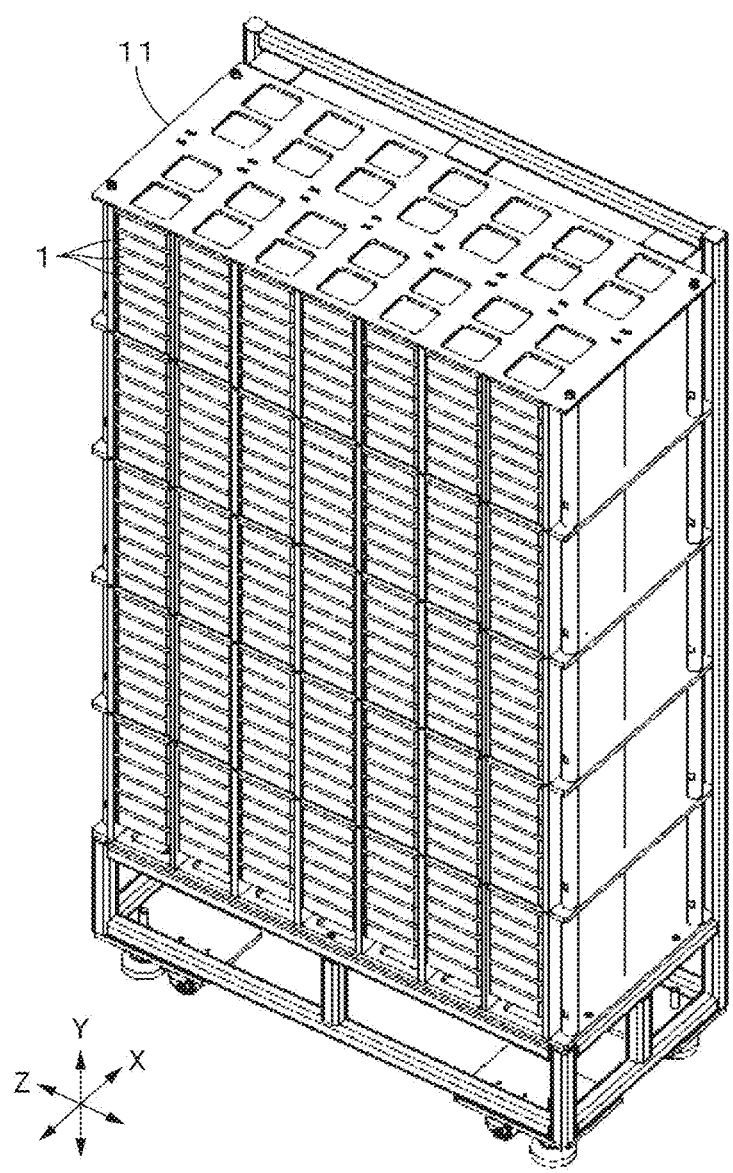
FIG. 4 is a perspective view used for explaining a tray rack.

For example, as illustrated in FIG. 4, the tray rack 11 has a plurality of storage units partitioned by five shelves, and a disc tray is mounted on each storage unit. The lowermost shelf is provided with storage units for six disc trays in a Y direction, and seven sets of six storage units are arranged in the Z direction. That is, there is provided a storage unit in which a maximum of 42 disc trays can be mounted. On the other shelves, storage units for seven disc trays are provided, seven sets of seven storage units are arranged in the Z direction, and a storage unit on which a maximum of 49 disc trays can be mounted is provided. Therefore, one tray rack 11 can store up to 238 (=42+49×4) disc trays.

Each of the storage units of the tray rack 11 has front and rear openings, and has a storage space slightly larger than the disc tray. An opening on the inside (hereinafter, referred to as the "front side") of the storage unit is opened so that the disc tray can be freely taken out by the tray transport robot, and a door covering the opening is provided outside thereof (hereinafter, referred to as the "rear side"). The transport robot moves in the Z direction on the front surface of the tray rack 11, and takes out a target disc tray on the basis of identification information such as a barcode. Furthermore, by opening the rear door of the tray rack 11, the operator can first set the disc tray in the storage unit of the tray rack 11 through the rear opening of the storage unit.

Note that it is designed that, after the disc tray is installed in the tray rack 11, the disc tray containing a medium cannot be taken in and out of the system. However, in a case where an error occurs, in a case where a disc in a library is taken out of the equipment, or in a case where an infrequently accessed tray is managed off-line, for example, it is desirable that the disc tray can be taken in and out of the system. For this reason, another tray rack dedicated to import/export may be installed in a part of the library system so that the disc tray storing the disc can be managed off-line.

"Example of the disc tray"

The disc tray 1 is formed such that four storage recesses 3a to 3d (collectively called the storage recess 3 in a case where it is not necessary to distinguish the individual storage recesses) are aligned on a box-shaped synthetic resin case 2 having an open top as illustrated in FIGS. 5A and 5B. Each storage recess 3 is a recess having substantially the same shape as the outer shape of the disc, and center poles 4a to 4d (collectively called the center pole 4 in a case where it is not necessary to distinguish individual center poles) for regulating the storage position in the case 2 are provided in a standing manner at the center. That is, N rows (for example, N=4) of discs 5 are stored. Note that four through-holes 61 penetrating the bottom plate of the case 2 are formed around the center pole 4. The through-hole 61 is a hole into which the pin of a disc pushing unit is inserted.

Figure 6:
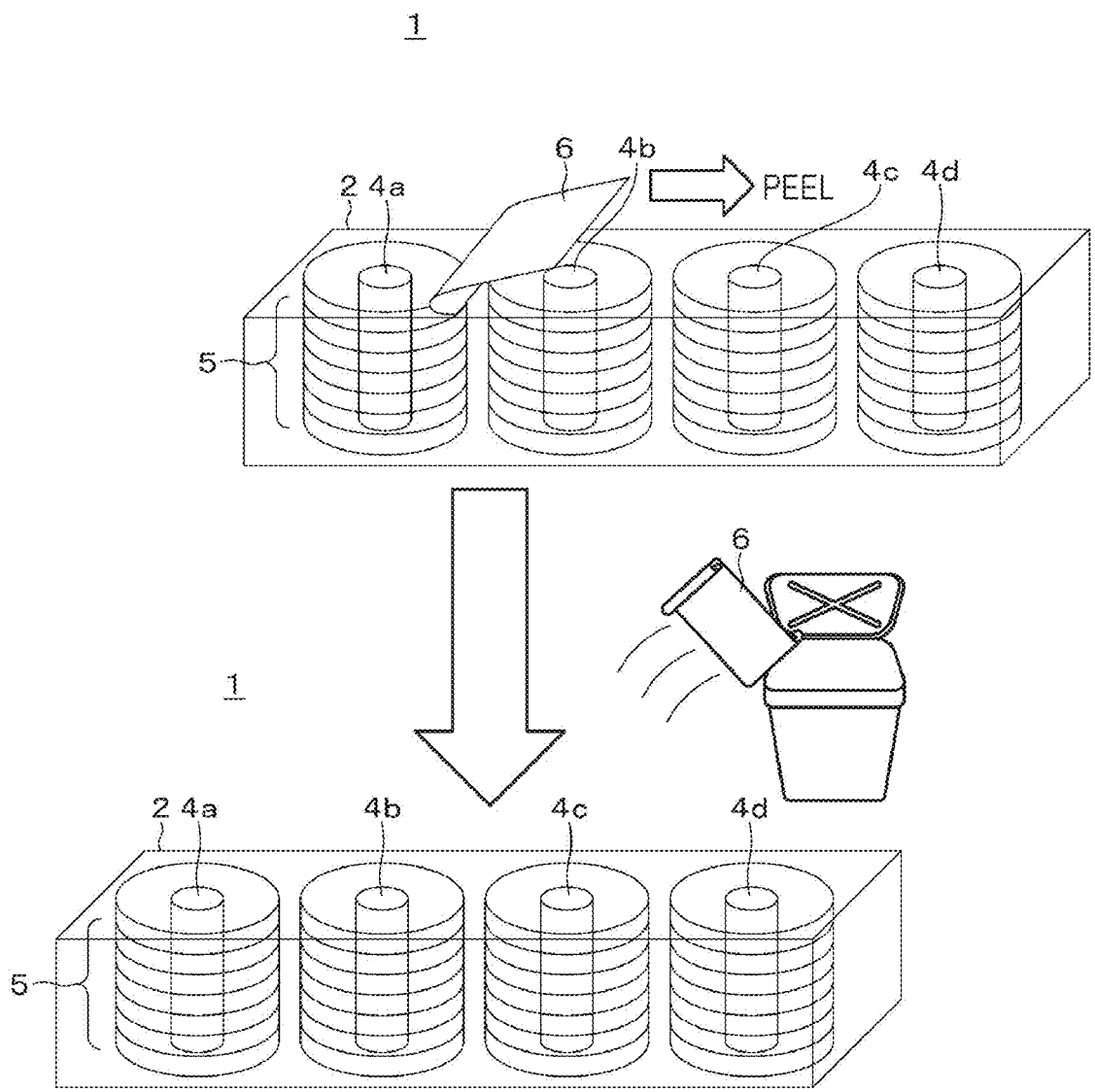
FIG. 6 is a perspective view used for explaining a disc tray.

As illustrated in FIG. 6, M (e.g., M=16) discs 5 are stacked and stored in the storage recess 3 (each row), and a disc cover is arranged at the top as will be described later. The center pole 4 penetrates through the center opening of the disc. Moreover, after the disc 5 is stored, the upper opening of the case 2 is covered with a transparent or translucent resin film 6. The disc storage container in which the disc is stored and sealed by a film 6 is called the disc tray 1. However, the film 6 is peeled from the case 2 and discarded at the time of use. When the opening is sealed by the film 6, dust can be prevented from adhering to the disc 5, and it can be guaranteed that the disc is an unused disc. Moreover, in a case where the film 6 is replaced, if the trace remains, the security can be further enhanced. Moreover, after the film 6 is peeled off, since a disc cover (not illustrated) is arranged on the uppermost layer of the stacked discs 5, floating dust is prevented from adhering to the disc 5 for data storage.

The disc cover is placed on the top of the plurality of discs 5 stored in the disc tray 1 to prevent dust from adhering to the discs 5. In a case where the disc tray 1 is stored on the shelf of the tray rack, there is a slight gap between the upper surface (open surface) of a certain disc tray 1 and the bottom surface of another disc tray 1 located above the disc tray 1. In a case where a large vibration such as an earthquake is applied to the tray rack, the disc can pop out of the disc tray 1 and fall.

Figure 7A:
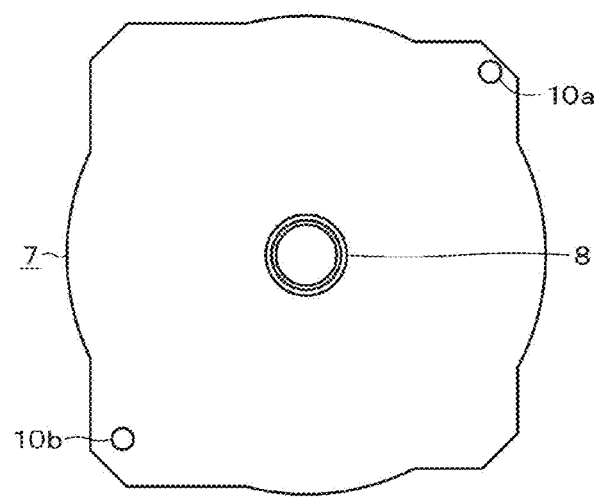
FIGS. 7A, 7B, and 7C are a plan view, a bottom view, and a perspective view of an example of a disc cover.
Figure 7B:
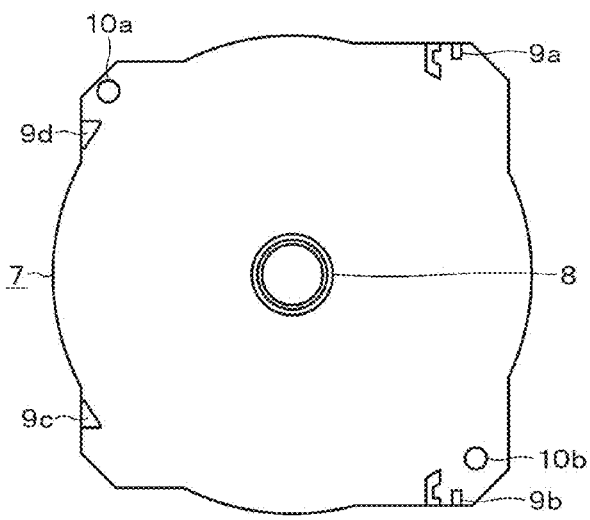
Figure 7C:
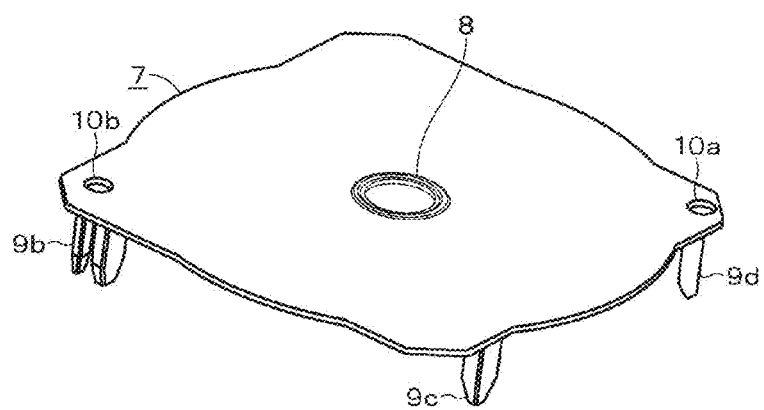

As an example, a disc cover 7 as illustrated in FIGS. 7A, 7B, and 7C is used. The disc cover 7 has a central opening 8 similar to the disc 5 formed on the main surface, legs 9a, 9b, 9c, and 9d protruding from four outer corners on the back surface (called the leg 9 in a case where it is not necessary to distinguish the individual legs), and holes 10a and 10b formed at two positions in a diagonal direction.

Figure 8:
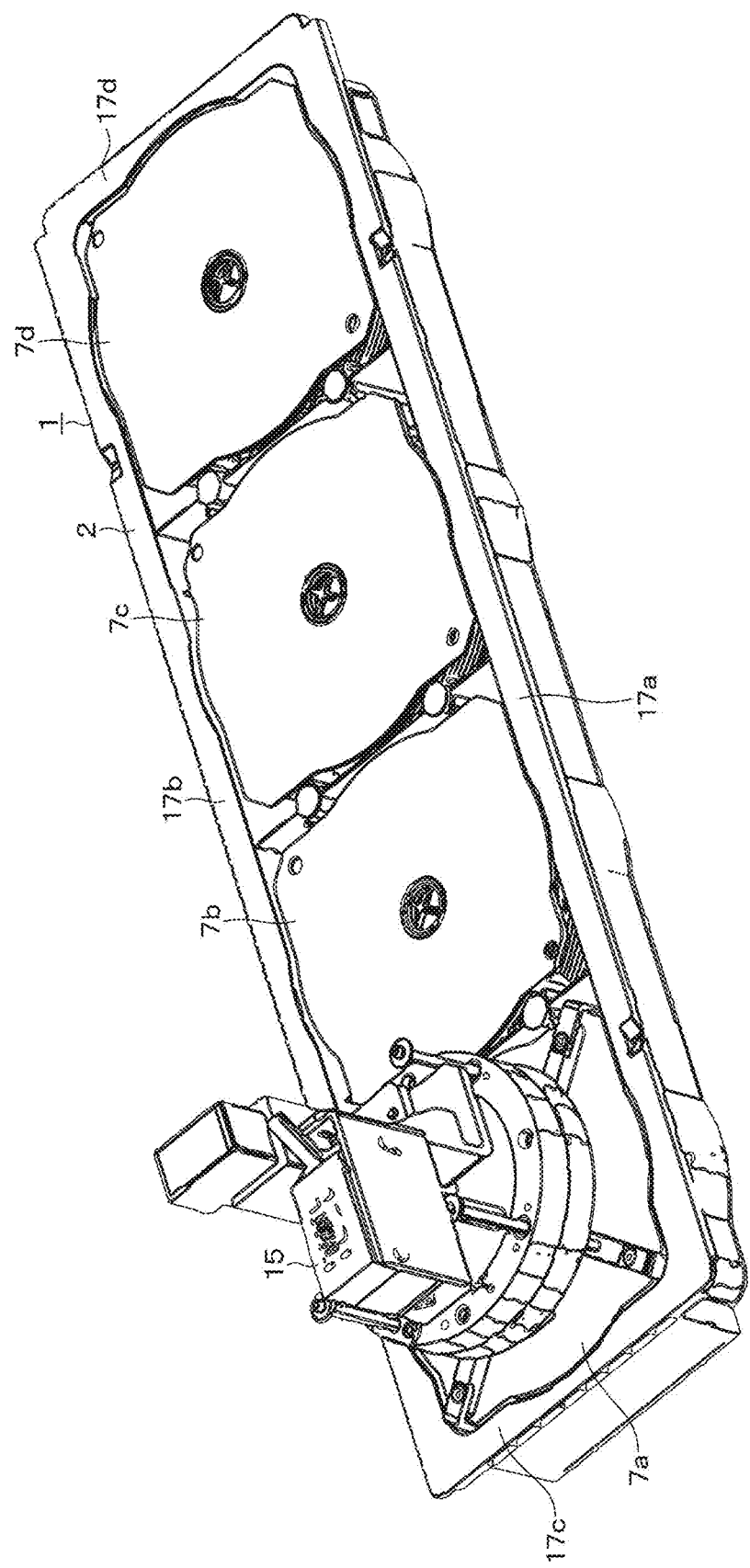
FIG. 8 is a perspective view of a disc tray with a disc cover attached.

As illustrated in FIG. 8, the disc covers 7a, 7b, 7c, and 7d cover the surfaces of the discs stacked in the storage recess of the case 2 of the disc tray 1. FIG. 8 illustrates a state in which the disc transport picker 15 is located above the stack body of one row of discs. The above-mentioned leg 9 engages with a part, for example, a protrusion formed in each storage recess. The length of the leg 9 is slightly larger than the width of the gap formed between the upper surface of the disc tray 1 and the bottom surface of another disc tray 1 located above the disc tray 1 in a case where the disc tray 1 is stored in the tray rack. The presence of such a leg 9 prevents the disc covers 7a to 7d from falling through the gap even in a case where the disc covers 7a to 7d vibrate. Note that the disc can be prevented from falling not only in a state where the disc tray 1 is stored in the tray rack but also in a case where the disc tray 1 is transported by the tray transport robot.

Moreover, a taper pin (not illustrated) formed below the arm portion of the picker 15 is inserted into the holes 10a and 10b. The rotation of the disc covers 7a to 7d is prevented by the engagement between the holes 10a and 10b and the tapered pins.

Figure 9A:
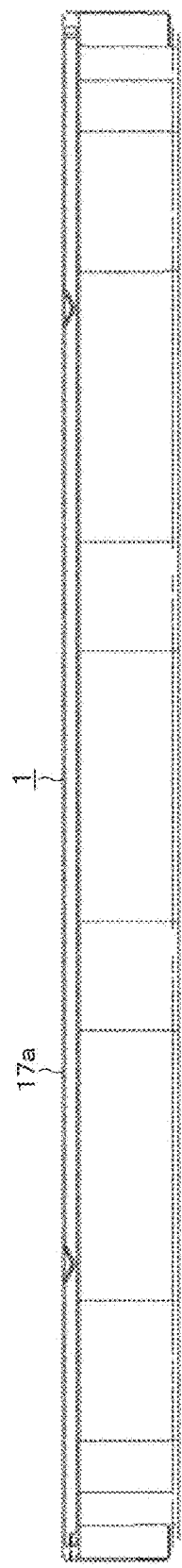
FIGS. 9A and 9B are a side view and a longitudinal central sectional view of a disc tray.
Figure 9B:
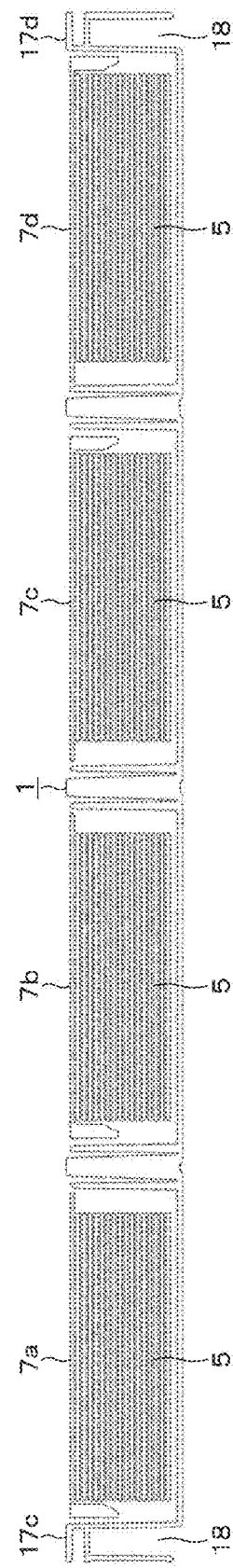
Figure 10:
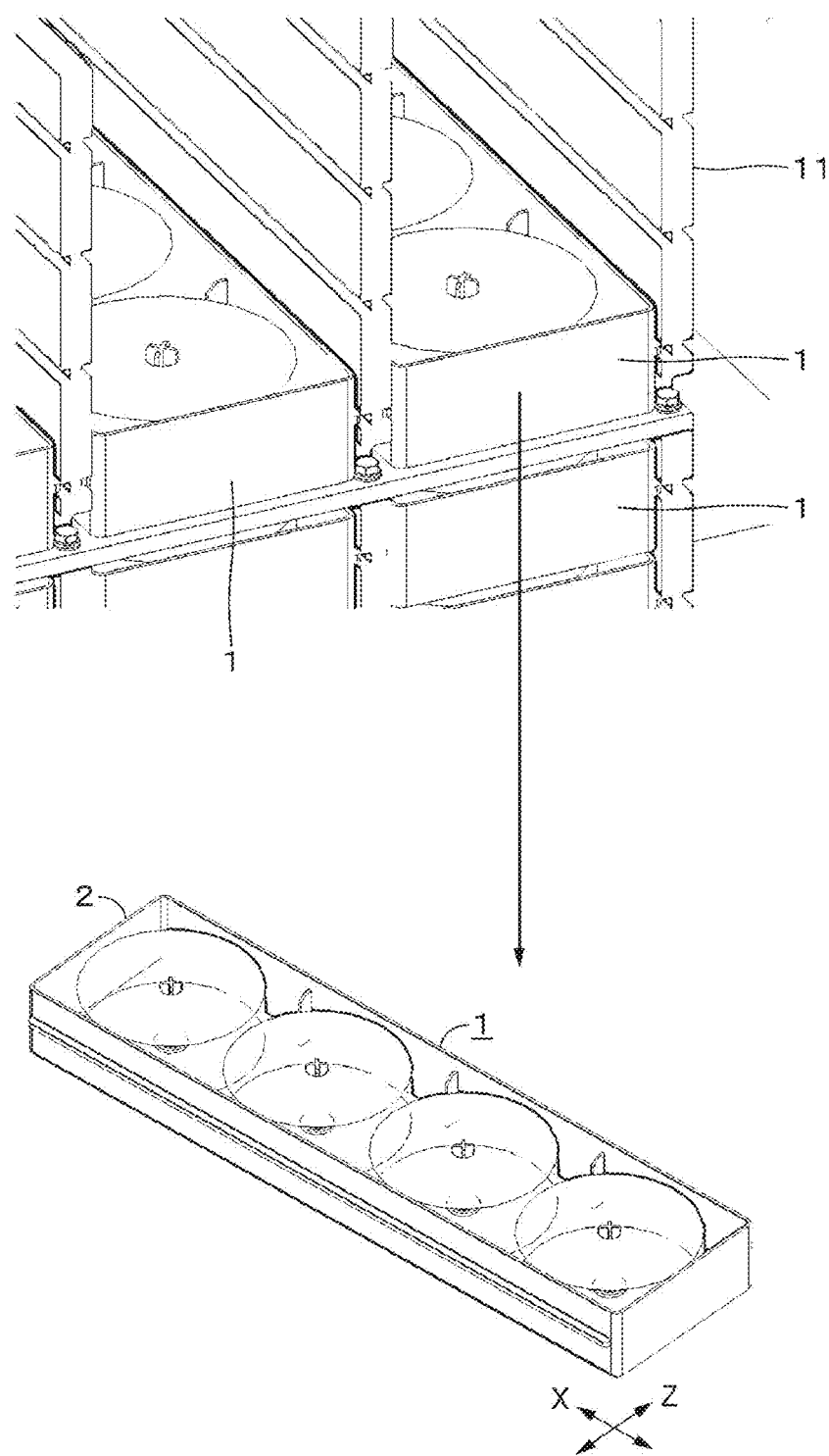
FIG. 10 is a perspective view used for explaining a disc tray and a tray rack.

FIGS. 9A and 9B illustrate a side view and a longitudinal central sectional view of the disc tray 1. As illustrated in FIGS. 8, 9A, and 9B, upper four edges of the case 2 of the disc tray 1 are protruded outward to form locking projections 17a, 17b, 17c, and 17d. The projections 17a and 17b function as guided units when the disc tray 1 slides in the accommodation space for accommodating the disc tray of the tray rack 11. Moreover, the ends of the front projection 17c and the rear projection 17d of the case 2 of the disc tray 1 are bent downward to form a space with an open lower surface. When the disc tray 1 is pulled out of the tray rack, locking claws provided on the tray transport robot 12 are inserted into the spaces 18.

Figure 11:
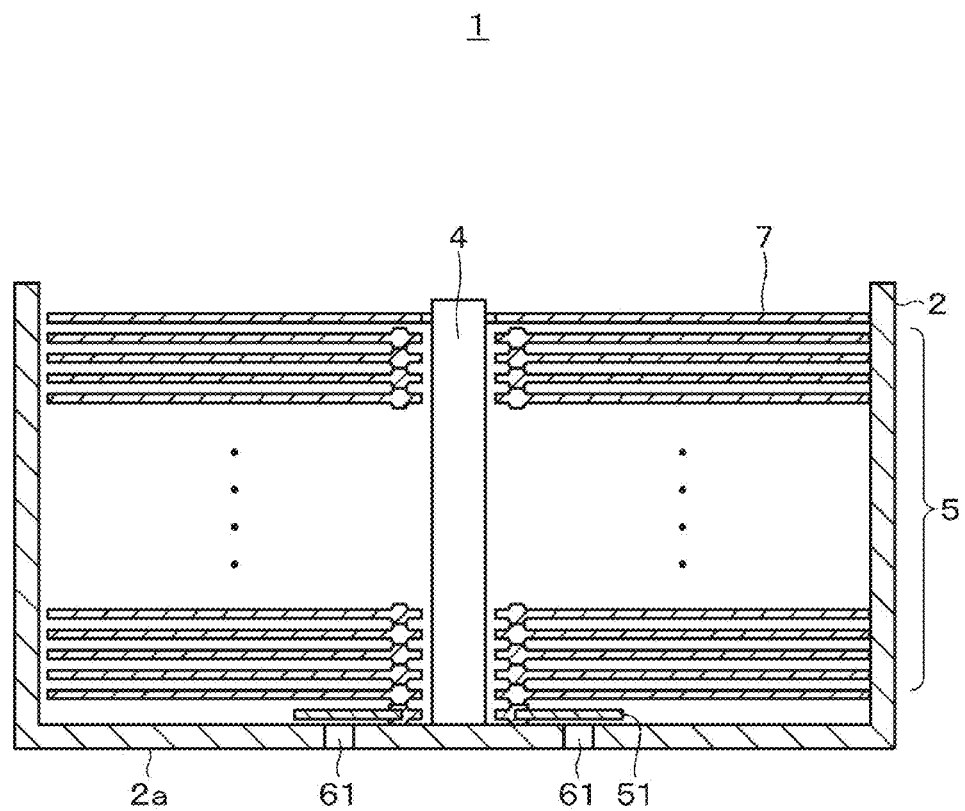
FIG. 11 is a sectional view for explaining a stack body in a disc tray.

As illustrated in FIG. 11, the disc tray 1 from which the film 6 has been peeled is set in each accommodation space of the tray rack 11. The length direction of the disc tray 1 is an X direction, and the width direction thereof is a Z direction. As described with reference to FIG. 1 to FIG. 4, the tray rack 11 has one accommodation space having a depth dimension slightly larger than the length of the disc tray 1 and has a width over which, for example, seven disc trays 1 can be arranged and stored side by side.

"Spacer"

FIG. 11 illustrates a cross section in a state where a plurality of discs 5 is stored in the storage recess 3 of the disc tray 1. However, for the sake of simplicity, only one of the four rows in the disc tray 1 is illustrated. The disc cover 7 is located on the uppermost surface of the discs 5. Furthermore, a spacer 51 is arranged on the lowermost surface of the discs 5. The center pole 4 penetrates through the respective center holes of the discs 5, the disc cover 7, and the spacer 51. Moreover, a plurality of through-holes 61 is formed through a bottom surface 2a of the case 2.

Figure 12A:
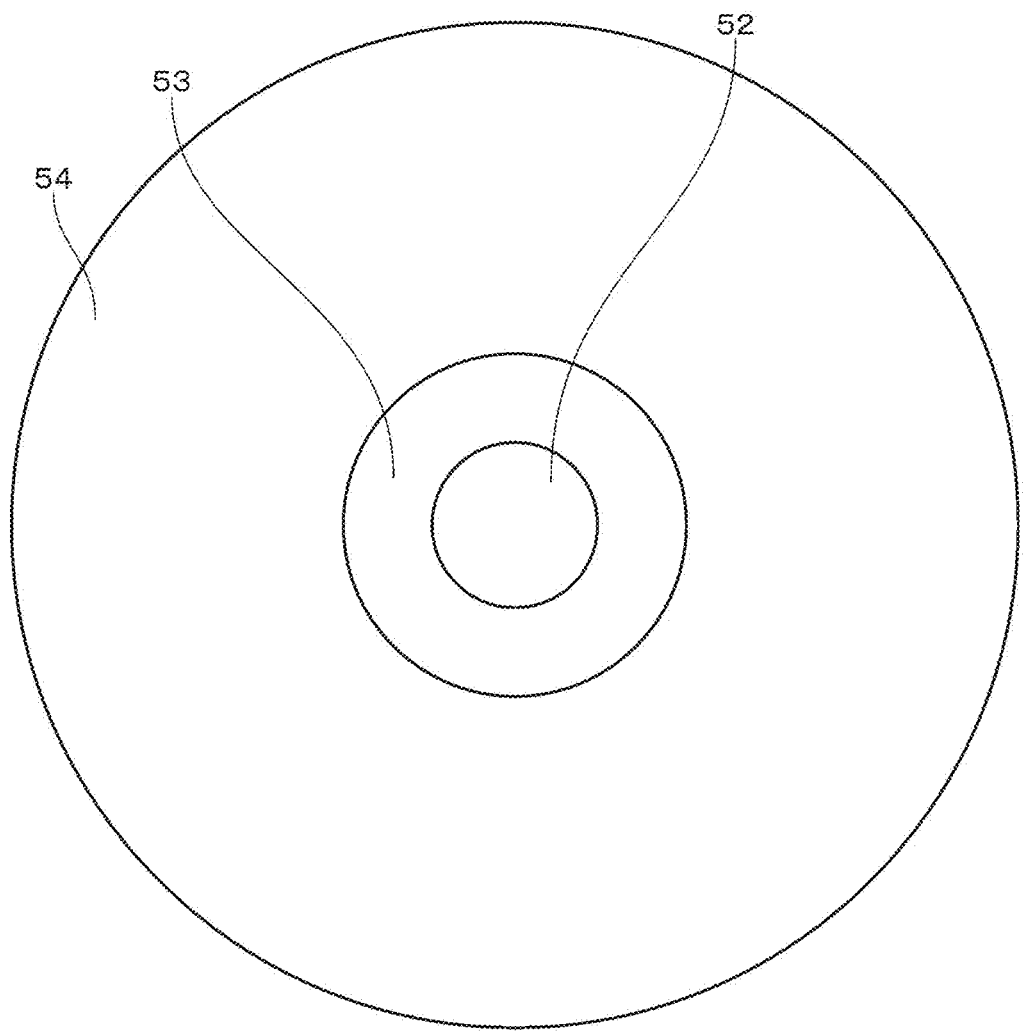
FIGS. 12A and 12B are a plan view and a sectional view of a spacer.
Figure 12B:
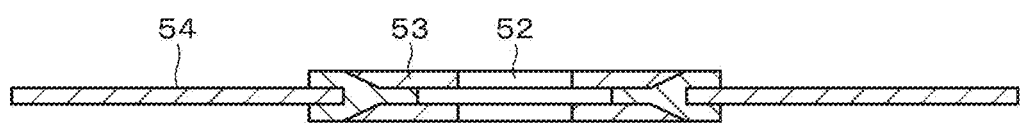

The spacer 51 is disposed on a bottom plate 2a of the case 2 and serves as a receiver for a disc stacked with a dustproof cover, and has a shape illustrated in FIGS. 12A and 12B. Similarly to the disc 5, a center opening 52 is formed in a resin ring 53. A metal plate 54 is provided concentrically with the resin ring 53. The spacer 51 is manufactured, for example, by insert molding the resin ring 53 and the metal plate 54.

The resin ring 53 is provided on the center side to prevent the center pole 4 from being scraped in a case where it comes into contact with the center pole 4 of the case 2. The resin ring 53 is, for example, polyacetal (POM), and the metal plate 54 is a magnetic metal that attaches to a magnet, such as stainless steel. The diameter of the spacer 51 is smaller than that of the disc 5. However, the diameter is set to such an extent that the disc 5 can be supported by the spacer 51.

Figure 13A:
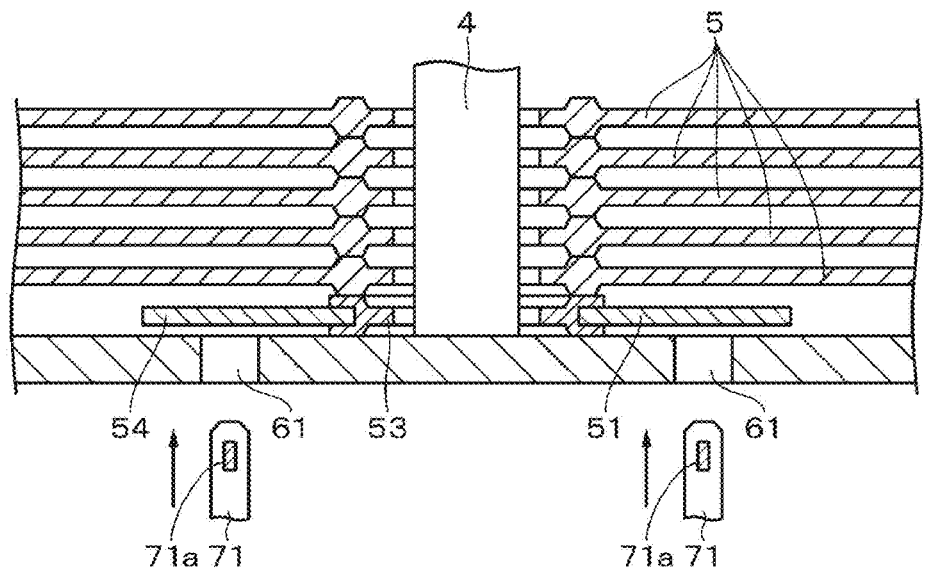
FIGS. 13A and 13B are sectional views used for explaining push-up of a pin.
Figure 13B:
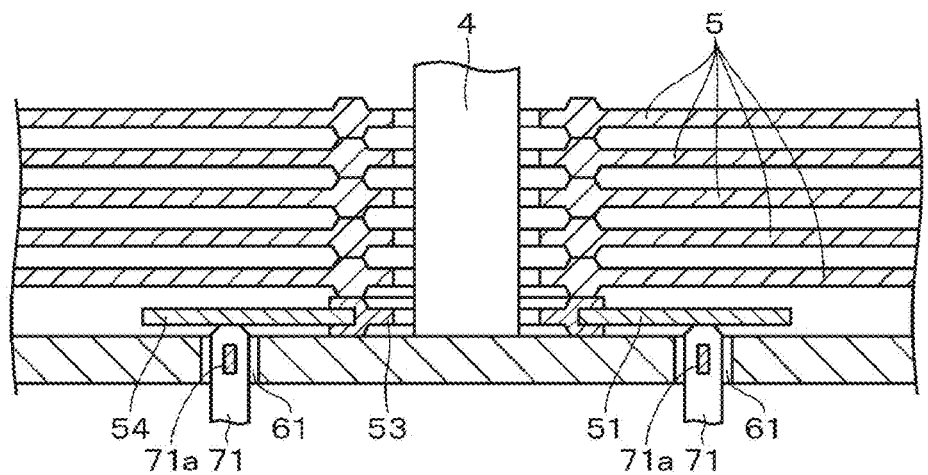

As illustrated in FIGS. 5A, 5B, and 11, a plurality of, for example, four through-holes 61 are formed around the center pole 4 of the bottom plate 2a of the case 2. FIGS. 13A and 13B schematically illustrate a state in which a pin 71 of a disc pushing pusher pushes up the spacer 51 in the disc tray 1 from below through the through-hole 61.

FIG. 13A illustrates a state in which the discs 5 and the spacer 51 are stacked and stored in the disc tray 1. The pin 71 of a disc pushing pusher stands by below the through-hole 61 of the bottom plate 2a of the case. At the tip of the pin 71, a magnet 71a is embedded. Note that an electromagnet may be used instead of the magnet. Furthermore, the spacer 51 may be sucked by sucking air.

When taking out a desired number of discs 5 from the disc tray 1, the pin 71 is inserted into the through-hole 61 as illustrated in FIG. 13B, and moreover the tip of the pin 71 contacts the metal plate 54 portion of the spacer 51. Then, when the pin 71 is further raised, the stacked discs 5 and spacer 51 are pushed upward.

When the discs 5 and the spacer 51 rise to a predetermined position, the lifting operation stops. Then, a predetermined number of discs 5 are taken out of the disc tray 1 by the disc transport picker 15 and transported to the turntable 16. Note that the configuration and operation of the disc transport picker 15 for taking out a predetermined number of discs 5 from the disc tray 1 will be described later.

In a case where the disc 5 is taken out of the disc tray 1, because the spacer conventionally includes resin, the spacer sometimes stuck to the lowermost disc 5 due to static electricity. In this case, the spacer is taken out of the disc tray 1 together with the lowermost disc 5 and transported. That is, the spacer is counted as a disc, and the number of discs to be taken out becomes different from the set number. In this case, the system determines that an error has occurred, and retries the operation of taking out the disc. Therefore, the performance of the system is reduced.

In order to avoid this problem, when the metal plate 54 of the spacer 51 is attracted to the magnet 71a at the tip of the pin 71, and even if attachment of the contact surface of the disc 5 and the spacer 51 occurs, the spacer 51 can be peeled off by a peeling force exceeding the weight of the disc 5, and it is possible to reliably prevent the spacer 51 from being taken out of the disc tray 1 and prevent a reduction in performance. Moreover, by electrically grounding the pin 71 of the pusher to the ground, the spacer 51 is grounded and the static electricity of the disc 5 can be removed.

"Turntable Operation"

Figure 14:
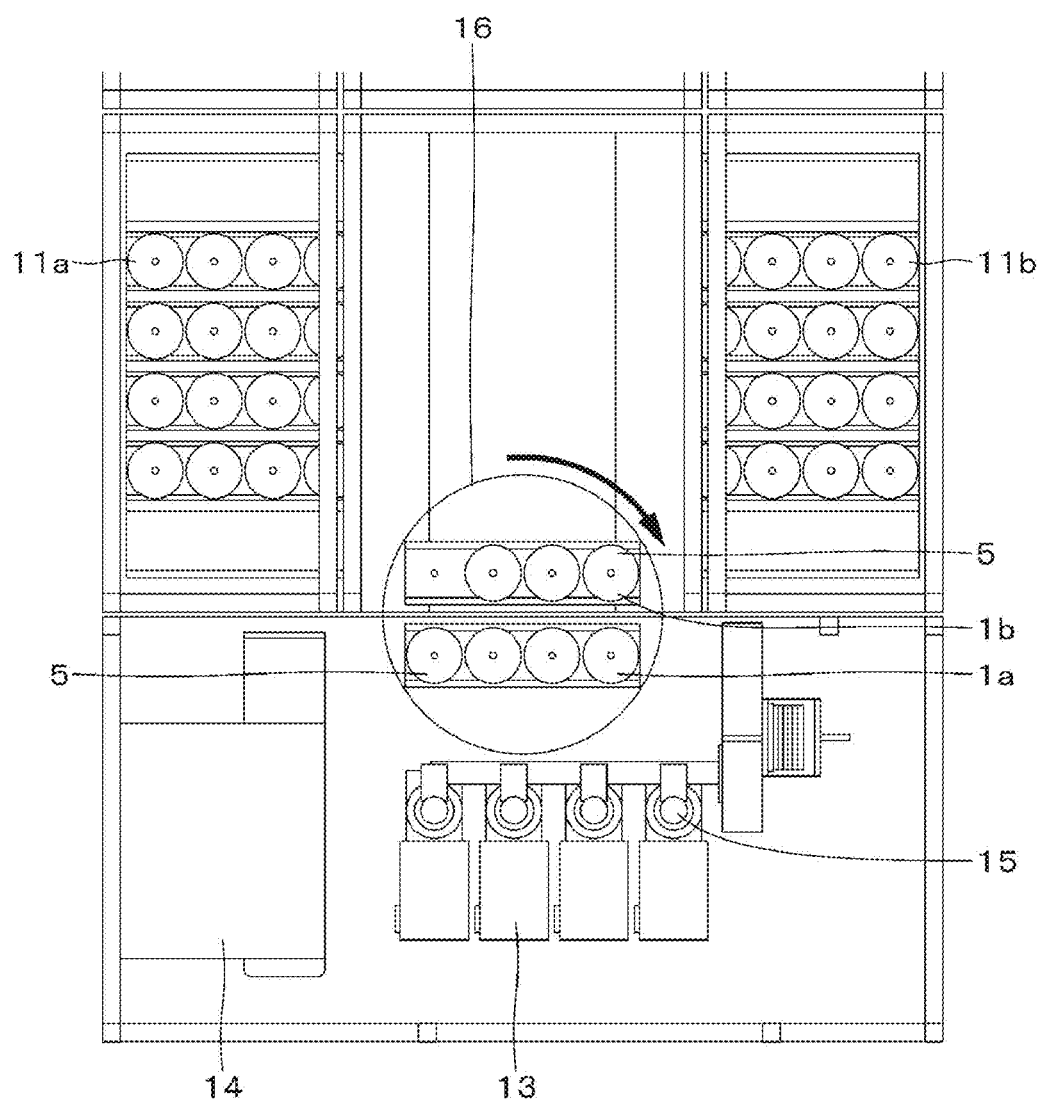
FIG. 14 is a plan view of a disc archive device.

The disc transport picker 15 and the turntable 16 are provided to transfer a disc between the tray transport robot 12 and the disc drive 13. FIG. 14 illustrates the turntable 16.

The turntable 16 is rotatable, and a first region and a second region on which two disc trays 1a and 1b are placed are set on the turntable 16. The turntable is divided into two sections with the diameter as a boundary, and the first region and the second region having a semicircular shape are formed. The disc trays 1a and 1b can be placed on each of the first region and the second region.

The positions of the disc tray 1a and the disc tray 1b are interchanged as the turntable 16 makes a half turn from the position illustrated in FIG. 14. Then, all the discs 5 are taken out from the disc tray 1a on the turntable 16 near the disc drive 13 by the disc transport picker 15.

The disc drive 13 is a device that records or reproduces information on the disc 5. In the disc drive 13, the disc 5 is placed on the drive tray 13a ejected from the main body, then the drive tray 13a is inserted into the main body, and the disc 5 is placed on the turntable rotated by a spindle motor. Then, it is configured such that data is recorded on or reproduced from the disc 5 by optical pickup. The disc drive 13 has a set of four drives arranged in the X direction and 16 sets arranged in the Y direction. That is, the disc drive 13 can simultaneously record or reproduce up to 64 discs 5 stored in one disc tray.

The disc transport picker 15 moves to above the opening of the case of the disc tray 1a, pulls out the disc 5 stored in one disc tray 1a from the case, and holds it. The removed disc 5 is transported to a position immediately above the tray ejected from each of the four drives arranged in one stage of the disc drive 13. Since the interval between the four discs 5 in the disc tray 1a is different from the interval between the drive shafts of the four drives, the disc transport picker 15 adjusts, e.g., increases, the interval between the removed four discs 5 and transports the discs to immediately above the tray.

In a case where the disc 5 is loaded into the disc drive 13, the drive trays 13a of the four drives located at the lowest position of the disc drive 13 are ejected, and the disc transport picker 15 transports the stacked discs 5 directly above the drive trays 13a. Then, the lowermost one disc 5 of the discs held by the disc transport picker 15 is separated, and the separated disc 5 is placed on the drive tray 13a. The placed disc is loaded into the drive when the drive tray 13a is pulled in.

Next, the disc transport picker 15 moves upward (Y direction), and the drive tray 13a is ejected from the four drives located second from the bottom of the disc drive 13. The second disc 5 from the bottom of the discs held by the disc transport picker 15 is separated and placed on the drive tray 13a. The placed disc is loaded into the drive when the drive tray 13a is pulled in.

Hereinafter, the similar operation is repeated, and the uppermost disc among the held discs is placed on the tray ejected from the uppermost drive, and the placed disc is pulled into the tray and loaded on the drive. In this way, the (four rows×16) discs 5 stored in one disc tray are loaded into the (four rows×16) drives of the disc drive 13, respectively.

Under the control of the controller that controls the system, when the processing including recording or reproduction with respect to the disc taken out of the current disc tray 1a on the first region of the turntable 16 ends, the turntable 16 is rotated half a turn, and processing including recording or reproduction is performed on a next disc tray 1b placed on the second region of the turntable 16.

Moreover, under the control of the controller, while performing the processing including recording or reproduction on the disc taken out of the current disc tray 1a on the first region of the turntable 16, the next disc tray 1b is selected by the tray transport robot 12, and the next selected disc tray 1b is placed on the second region of the turntable 16.

That is, while information is recorded or reproduced with respect to the disc 5 of the disc tray 1a, the disc tray 1b to be used next is placed on the opposite side of the surface of the turntable 16, so that preparation of switching from the disc tray 1a to the disc tray 1b can be made. That is, when the recording or reproduction regarding the disc 5 stored in the disc tray 1a ends, the disc transport picker 15 unloads the (four rows×16) discs 5 from the disc drive 13. Contrary to the loading, unloading is started from the top four disc drives 13. Then, the unloaded disc 5 is returned to the disc tray 1a, and moreover the disc tray 1a is placed on the turntable 16. Next, the turntable 16 makes a half turn, and the disc 5 in the disc tray 1b is loaded into each drive of the disc drive 13 by the disc transport picker 15.

"Disc Tray Switching Operation"

Figure 15:
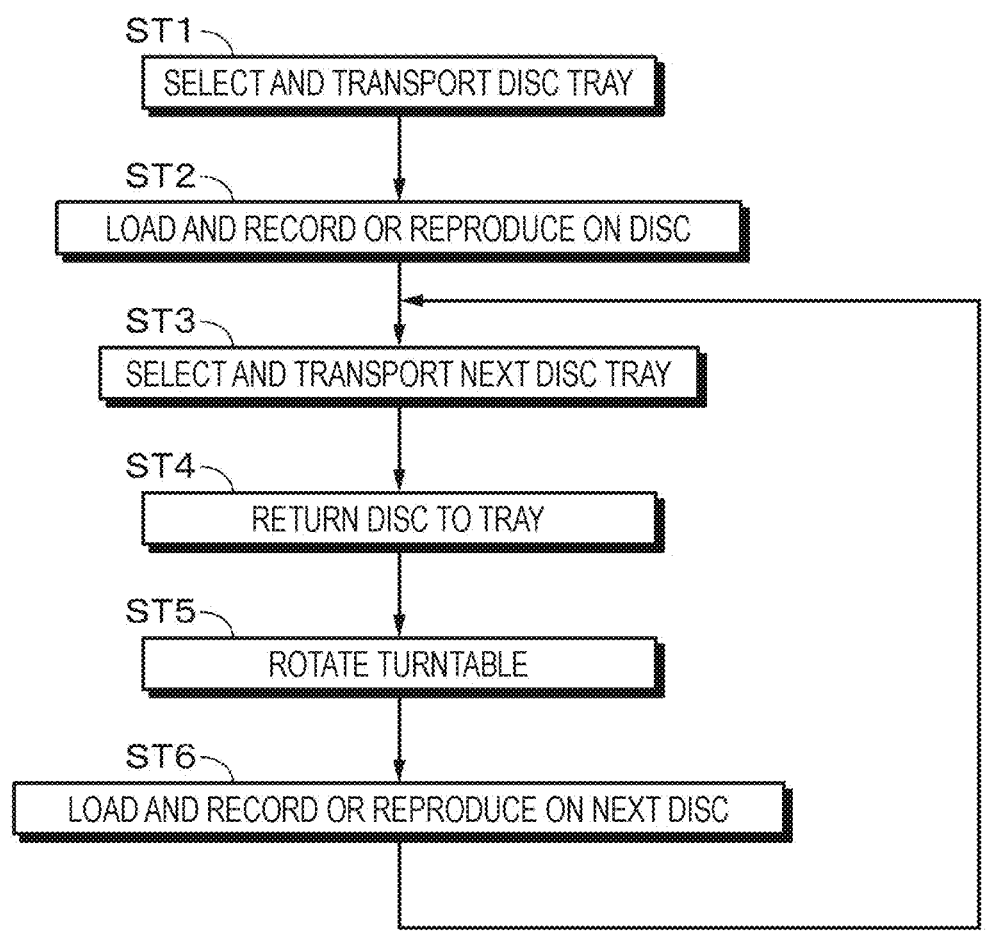
FIG. 15 is a flowchart illustrating a flow of processing of a disc archive device.

The switching operation of the disc tray will be schematically described with reference to FIG. 15. In the initial state, it is assumed that no disc tray is placed on the turntable 16.

Step ST1: The disc tray (e.g., the disc tray 1a) is selected, and the selected disc tray is transported by the tray transport robot 12.

Step ST2: Loading of the disc 5 to the disc drive 13 is performed by the disc transport picker 15. Then, the disc drive 13 performs recording or reproduction with respect to the loaded disc 5.

Step ST3: While recording or reproduction is being performed on the disc 5 in the first disc tray, the next disc tray (for example, the disc tray 1b) is selected, and the selected next disc tray is transported by the tray transport robot 12. The next disc tray is placed on the turntable 16.

Step ST4: When recording or reproduction is ended, the disc 5 is returned to the first disc tray by the disc transport picker 15.

Step ST5: The turntable 16 is rotated half a turn, and the next disc tray is positioned near the disc transport picker 15.

Step ST6: The disc 5 on the next disc tray is loaded into the disc drive 13 by the disc transport picker 15. Then, the disc drive 13 performs recording or reproduction with respect to the loaded disc 5. Then, the processing returns to step ST3 (moreover, selection and transport of the next disc tray), and the above-described processing is repeated.

As described above, because the next disc tray is placed on the turntable 16 while recording or reproduction is being performed on the disc 5 in the disc tray, as the time required for switching the disc tray, the time for making half a turn of the turntable 16 is sufficient, and the switching time can be reduced. Besides, since one disc tray stores (4 rows×16) discs, a large number of discs can be switched in a short period of time.

"Tray Transport Robot"

In a state where the disc tray 1 is stored in the tray rack 11, the upper open space is restricted by the bottom surface of the other disc tray 1 on the upper side, so that the disc covers 7a to 7d can be prevented from popping out. However, when the disc tray 1 is taken out of the tray rack 11 and transported by the tray transport robot 12, there is no restriction above, so that the disc cover 7 and the disc 5 can pop out of the tray rack 11.

Figure 16:
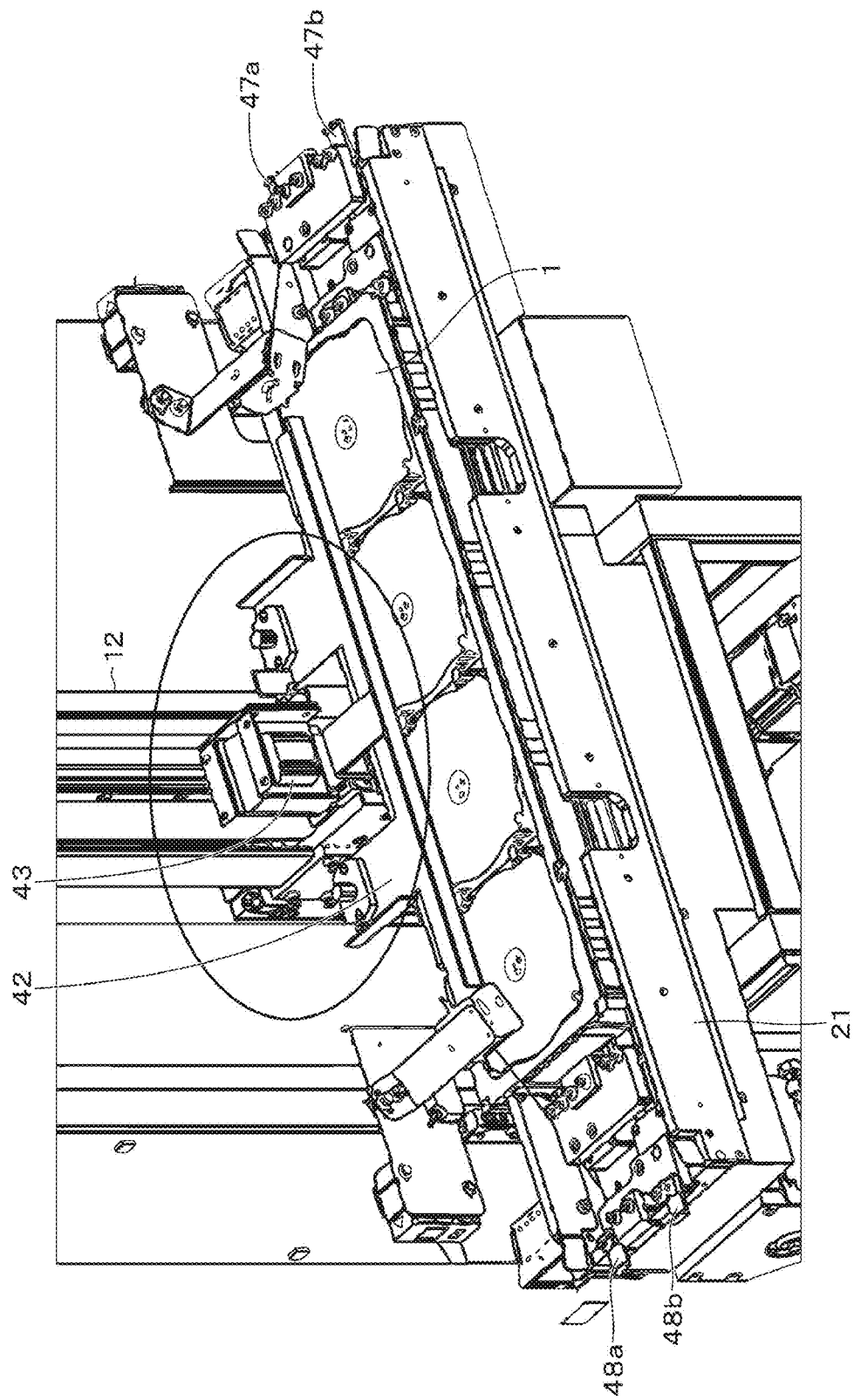
FIG. 16 is a perspective view used for explaining a tray transport robot.

As illustrated in FIG. 16, the tray transport robot 12 has a tray placement unit 21 that holds the disc tray 1. The disc tray 1 inserted from the side opening is slid and arranged at a predetermined position of the tray placement unit 21. In order to pull out the disc tray 1 from the tray rack 11, locking claws 47a and 47b and 48a and 48b are provided at the end of the tray placement unit 21. A pair of locking claws 47a and 47b (or 48a and 48b) is inserted into space 18 (see FIGS. 9A and 9B) at the ends of the disc tray 1 and hooked on the surface of the ends of the disc tray 1. The locking claws 47a to 48b are movable on the tray placement unit 21 by a transport mechanism such as an endless belt or a roller chain. The disc tray 1 whose end is hooked by the locking claws 47a to 48b is brought onto the tray placement unit 21 by the movement of the locking claws 47a to 48b.

Figure 17:
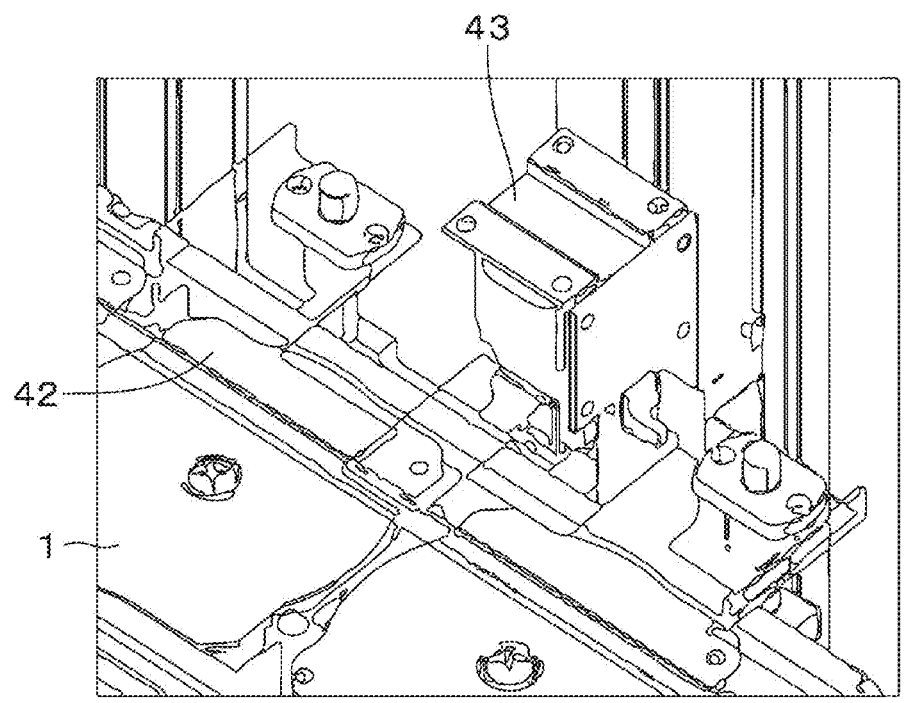
FIG. 17 is a perspective view illustrating a part of a tray transport robot.

On the upper surface of the tray placement unit 21, a roof-like stopper 42 slightly shorter than the longitudinal length of the disc tray 1 is provided so as to be movable up and down. As illustrated in FIG. 17 by enlarging a portion surrounded by a circle in FIG. 16, the stopper 42 is configured to be moved up and down by a solenoid 43. At the position where the stopper 42 has lowered, a gap is formed between the lower surface of the stopper 42 and the upper surface of the disc tray 1. This gap is shorter than the length of the leg 9.

Since the stopper 42 is provided, the disc cover 7 and the disc 5 can be prevented from popping out. Moreover, it is possible to prevent the disc tray 1 from popping out of the tray placement unit 21. Note that the reason why the stopper 42 is moved up and down by the solenoid 43 is to avoid collision with the pins provided on the turntable 16 when the disc tray 1 is transferred to the turntable 16.

"Turntable Mechanism"

Figure 18:
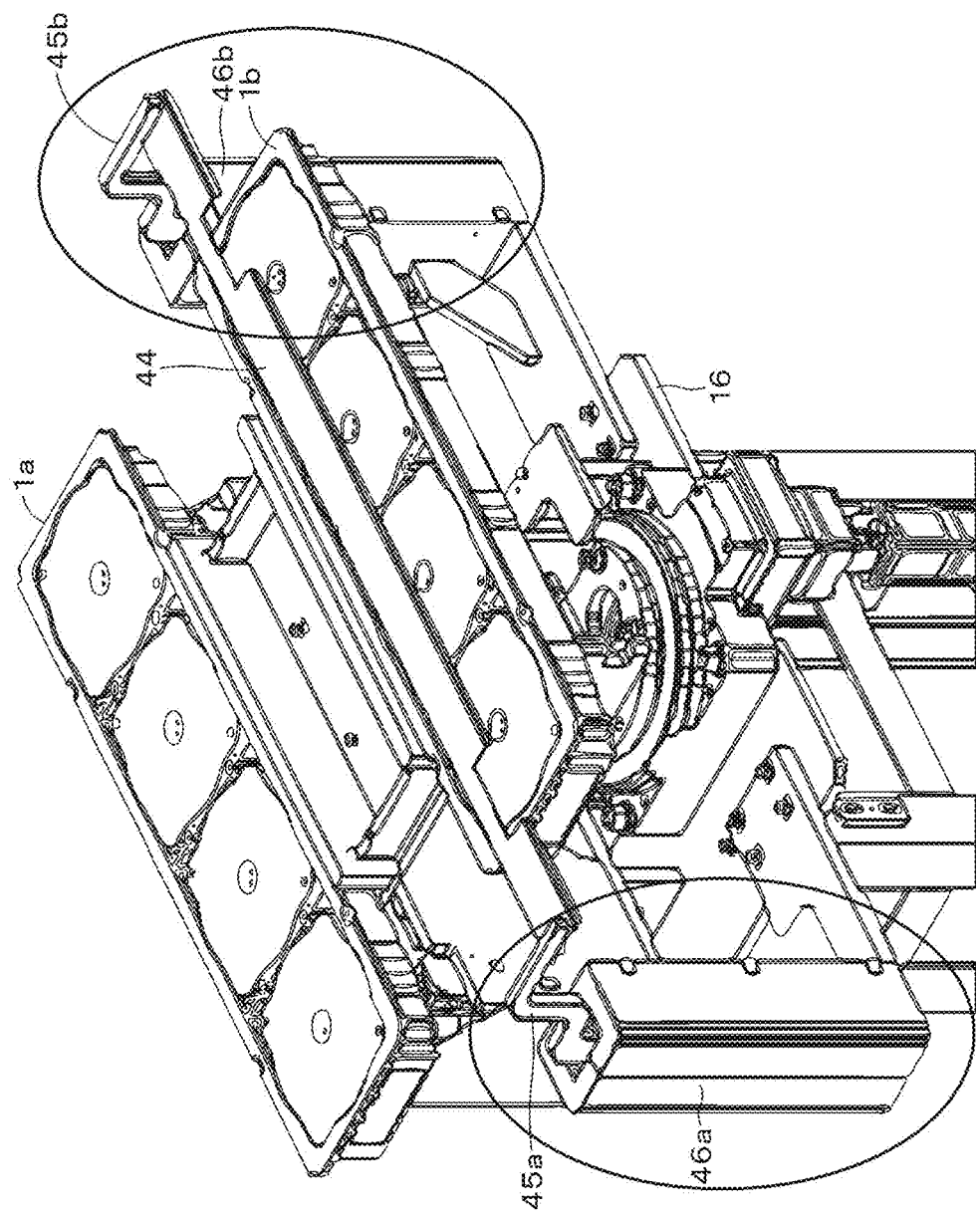
FIG. 18 is a perspective view used for explaining a turntable.
Figure 19:
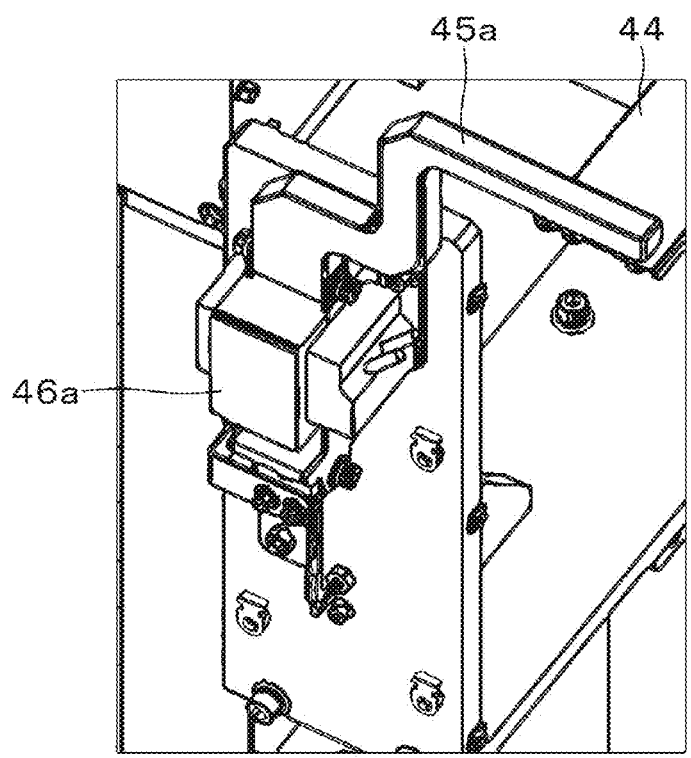
FIG. 19 is a perspective view illustrating a part of a turntable.

FIG. 18 is a perspective view of a part of the turntable 16, and FIG. 19 is an enlarged view of a portion surrounded by a circle in FIG. 18. In FIG. 19, the case outside a solenoid actuator 46a is removed. As described above, the turntable 16 is rotatable, the disc tray 1a on the first region of the turntable 16 is subjected to the processing including recording or reproduction, and the next selected disc tray 1b is placed on the second region of the turntable 16. A roof-like stopper 44 is provided in a second region where the disc tray is transferred to and from the tray transport robot 12.

The stopper 44 is a plate-shaped member slightly longer than the longitudinal length of the disc tray 1b, and both ends are supported by arms 45a and 45b. The arms 45a and 45b are connected to drive shafts of solenoid actuators 46a and 46b, respectively, and the stopper 44 is configured to be moved up and down by the solenoids 46a and 46b. At the position where the stopper 44 is lowered, a gap is formed between the lower surface of the stopper 44 and the upper surface of the disc tray 1. This gap is shorter than the length of the leg 9.

Since the stopper 44 is provided, the disc cover 7 and the disc 5 can be prevented from popping out. Moreover, it is possible to prevent the disc tray 1 from popping out of the turntable 16. Note that the reason why the stopper 44 is moved up and down by the solenoids 46a and 46b is to avoid collision with the disc tray 1 on the tray transport robot 12 when the turntable 16 receives the disc tray 1.

Figure 20:
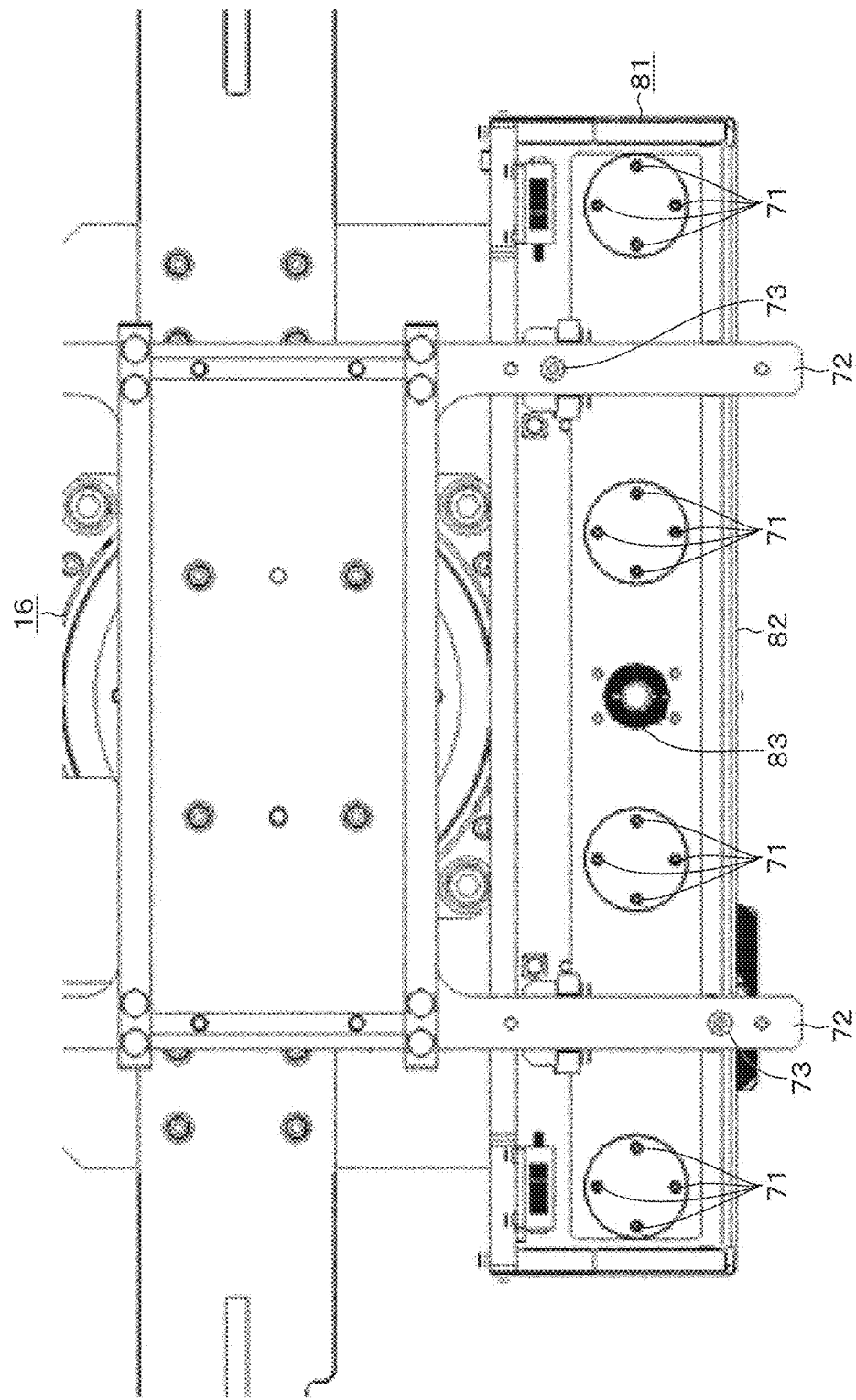
FIG. 20 is a plan view of a part of a turntable.
Figure 21:
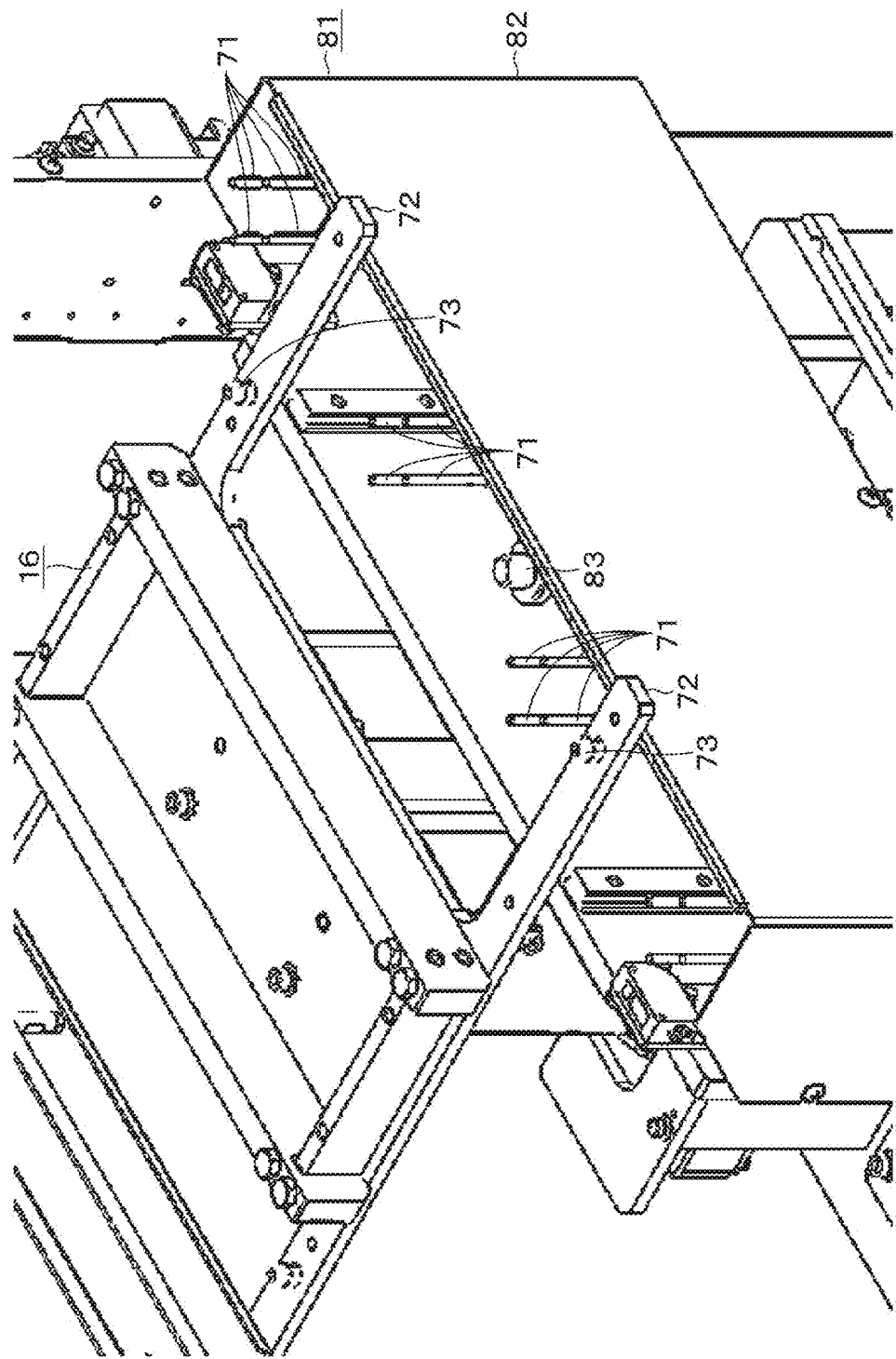
FIG. 21 is a perspective view illustrating a part of a turntable.
Figure 22:
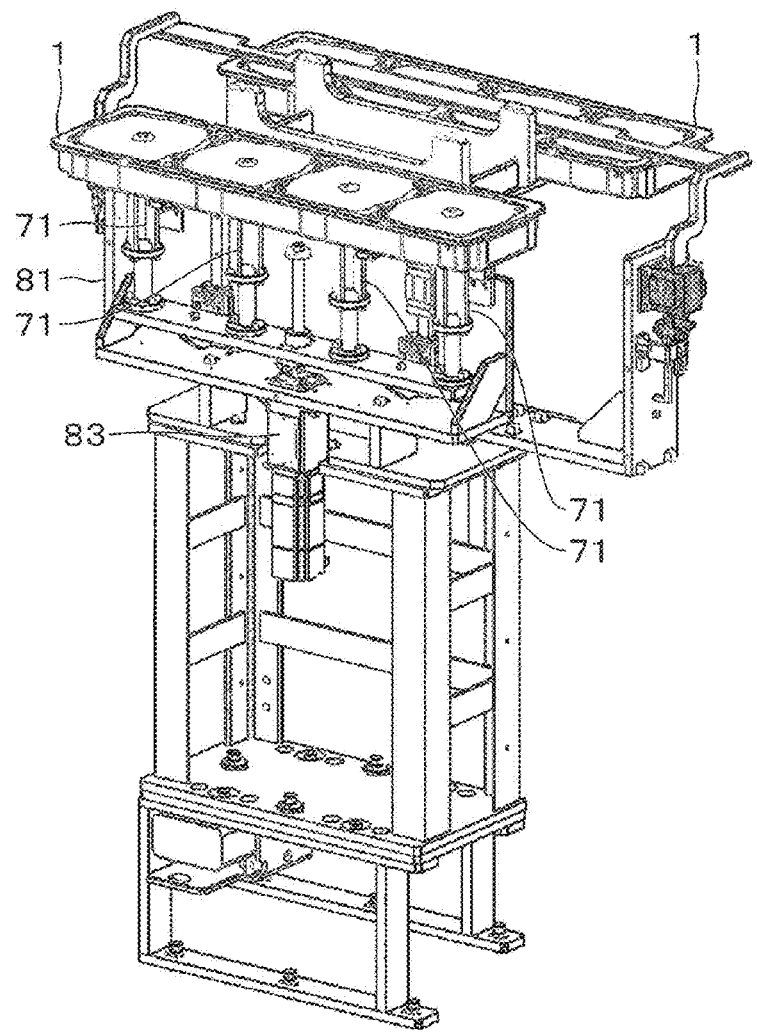
FIG. 22 is a perspective view illustrating a part of a turntable.

The turntable 16 will be further described with reference to FIG. 20 to FIG. 23. FIG. 20 and FIG. 21 are a plan view and a perspective view, respectively, of a part of the turntable 16 when the disc tray 1 is removed. The turntable 16 is provided with a tray placement unit including two parallel support arms 72. A position restriction pin 73 that fits into a hole provided on the bottom surface of the disc tray 1 protrudes from each support arm 72, and stably holds the disc tray 1 placed as illustrated in FIG. 22.

Figure 23:
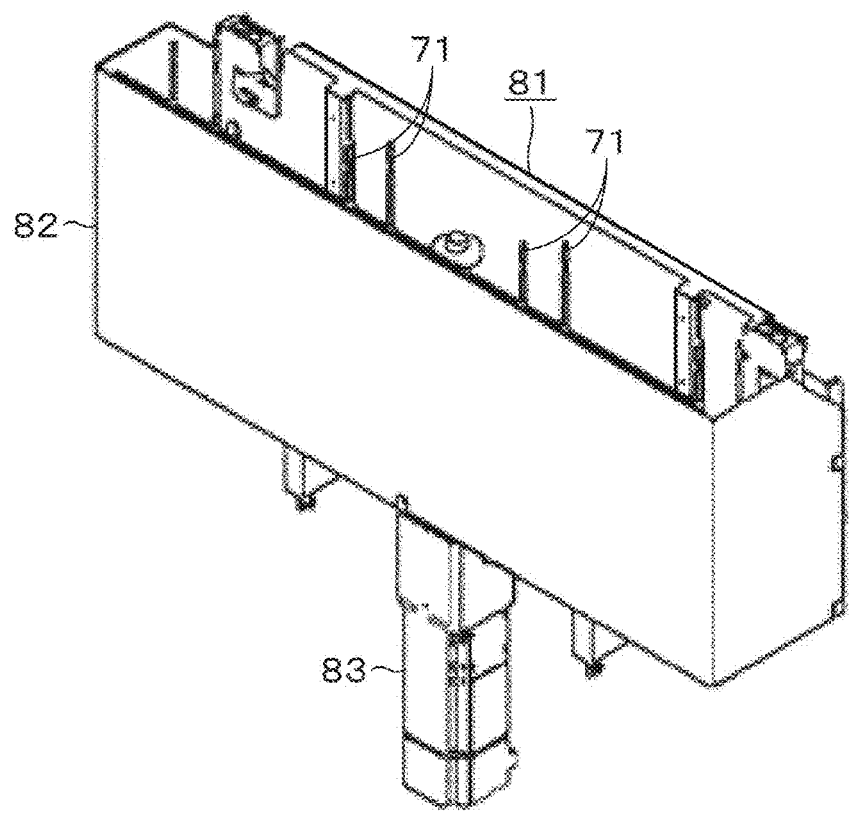
FIG. 23 is a perspective view illustrating a part of a turntable.

A disc pushing pusher 81 is provided below the support arm 72 as the tray placement unit. The disc pushing pusher 81 is installed in the cover 82. FIG. 22 is a perspective view illustrating a state where the cover 82 is removed. Furthermore, FIG. 23 is a perspective view illustrating the disc pushing pusher 81 solely. The disc pushing pusher 81 is configured to be able to move up and down by an actuator 83. Note that since the disc pushing pusher 81 is used in a case where the disc is taken out by the disc transport picker 15, even if the turntable 16 has two tray placement units, it is provided by being associated with only one tray placement unit.

The disc pushing pusher 81 includes a pin 71 inserted into the disc tray 1 through the through-hole 61 in the bottom plate of the disc tray 1 placed on the support arm 72. That is, as described above with reference to FIGS. 13A and 13B, the pin 71 of the disc pushing pusher pushes the spacer 51 and the disc 5 in the disc tray 1 from below through the through-hole 61.

"Loading the disc into the drive"

Next, with reference to FIGS. 24, 25, 26A, 26B, and 26C, a pusher (hereinafter, referred to as a drive loading pusher) used in a case where the disc 5 transported by the disc transport picker 15 is mounted on the drive tray 13a of the drive 13 is described.

The disc transport picker 15 takes out the plurality of discs 5 in a stacked state from the disc tray 1, supports the plurality of discs 5, and transports the plurality of discs 5 to a position near the drive 13. The drive loading pusher performs an operation of separating and placing one disc on the drive tray 13a in cooperation with the disc transport picker 15. As will be described later, the disc transport picker 15 has a plurality of claws provided at the same height for supporting/separating the disc 5, a picker drive unit 15a provided with a drive source such as a plunger and a motor, and a picker mechanism unit 15b for moving the claws.

The drive tray 13a of the disc drive 13 is ejected, and the plurality of discs 5 held by the disc transport picker 15 is located above (for example, directly above) the drive tray 13a. In this state, the disc transport picker 15 operates, and the picker pusher on which the lowermost disc 5 is mounted is lowered and placed on the drive tray 13a.

Figure 24:
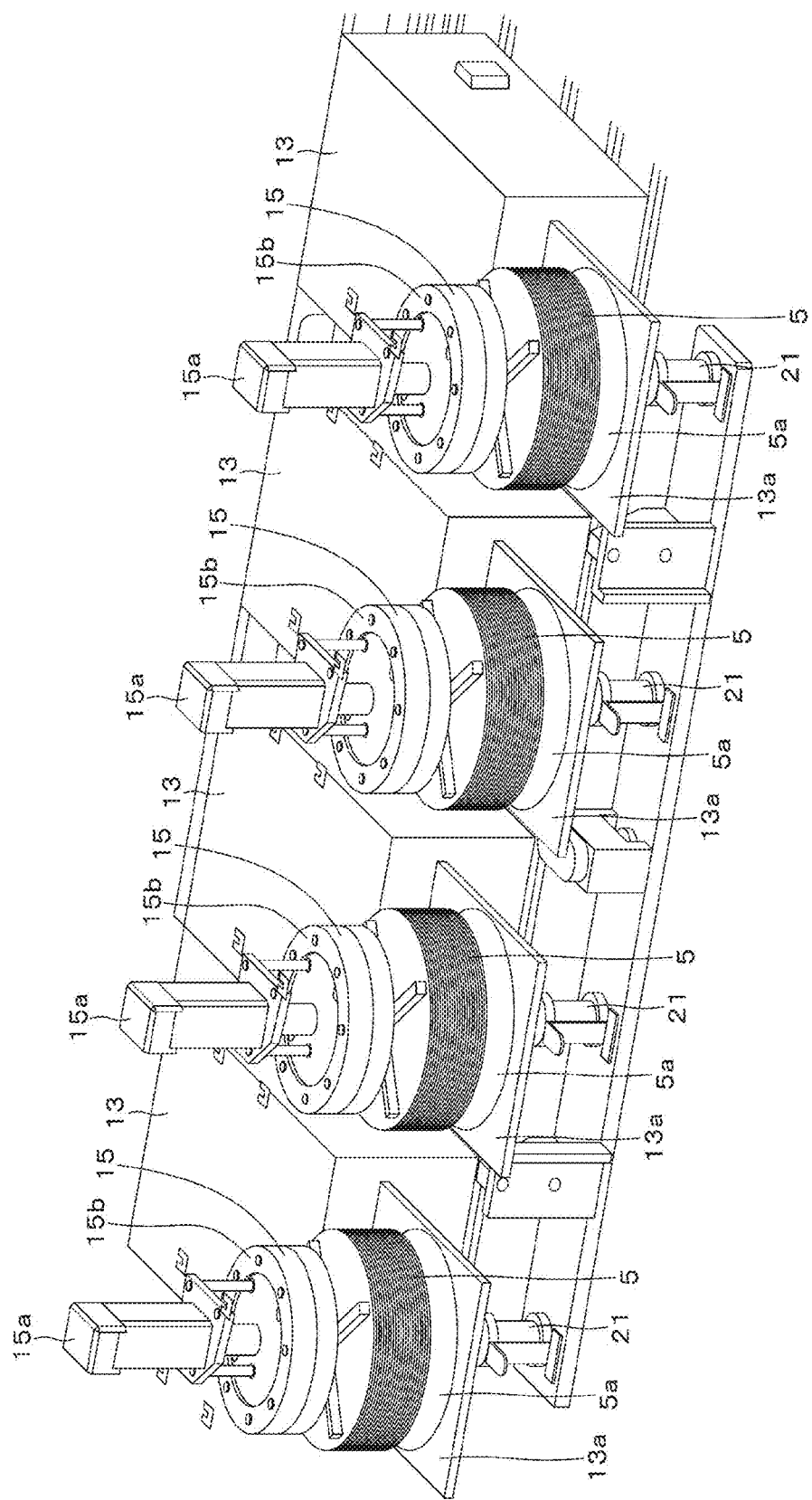
FIG. 24 is a perspective view used for explaining a disc transport picker.
Figure 25:
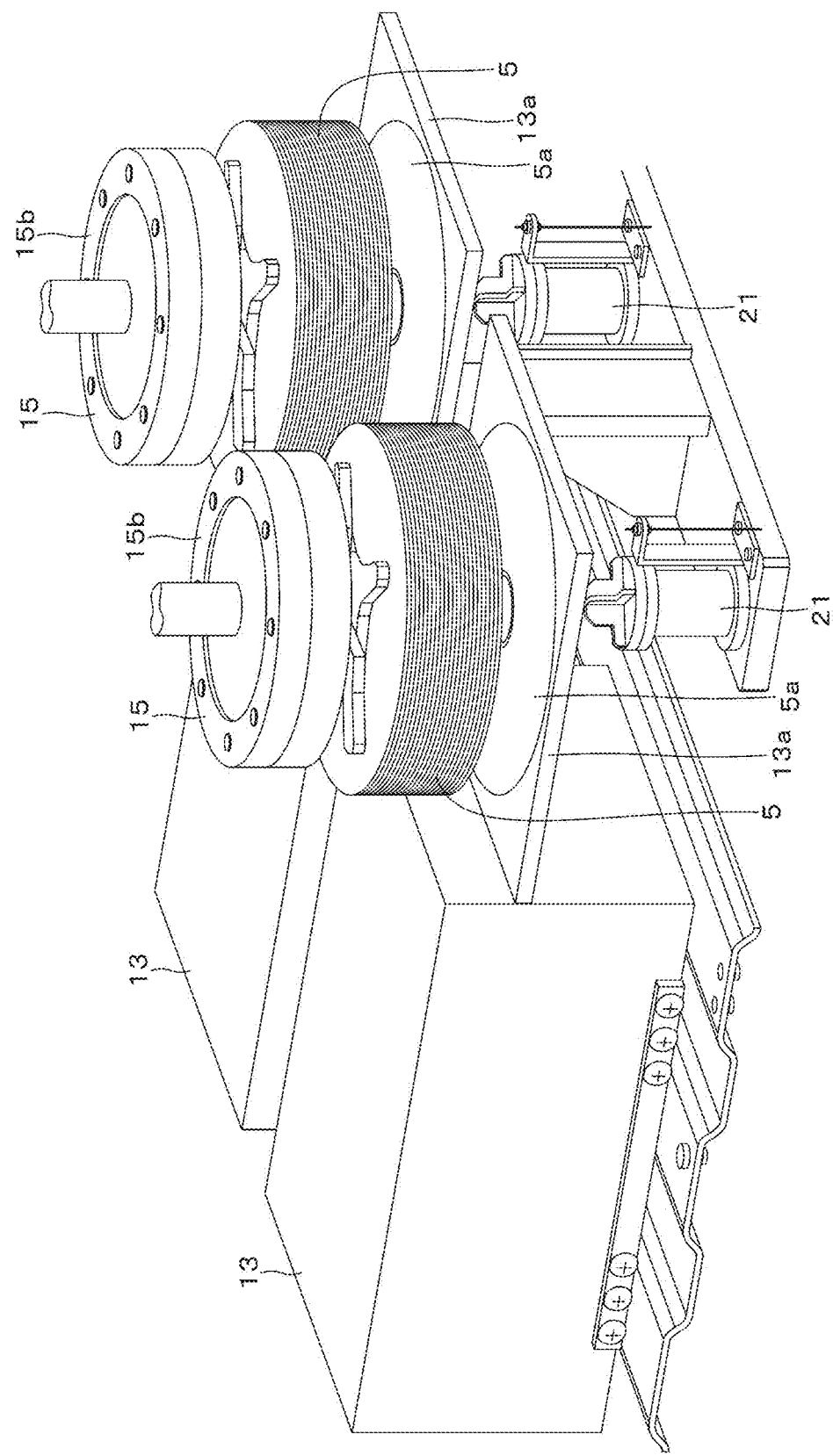
FIG. 25 is a perspective view used for explaining a disc transport picker.

FIG. 24 and FIG. 25 illustrate a state where a disc 5a is placed on the drive tray 13a. Note that the disc placed on the drive tray 13a is referred to as the disc 5a to distinguish it from other discs. The drive loading pusher is configured by a picker pusher whose center matches that of the disc transport picker 15 and which is configured to be moved up and down. A pusher 22 (see FIG. 26A) is provided at the tip of the picker pusher. Note that the line connecting the center of the disc transport picker 15 and the center of the picker pusher is designed to pass through the center of the center hole of the drive tray 13a when the disc 5 is placed on the drive tray 13a.

Figure 26A:
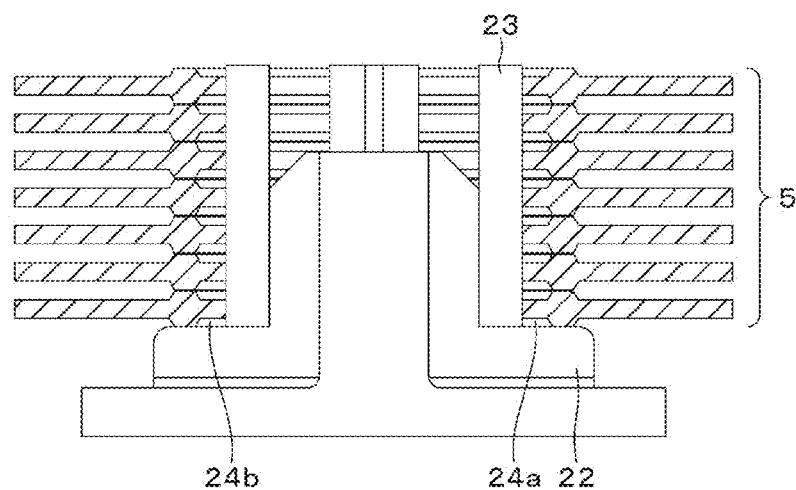
FIGS. 26A, 26B, and 26C are sectional views used for explaining a picker pusher.
Figure 26B:
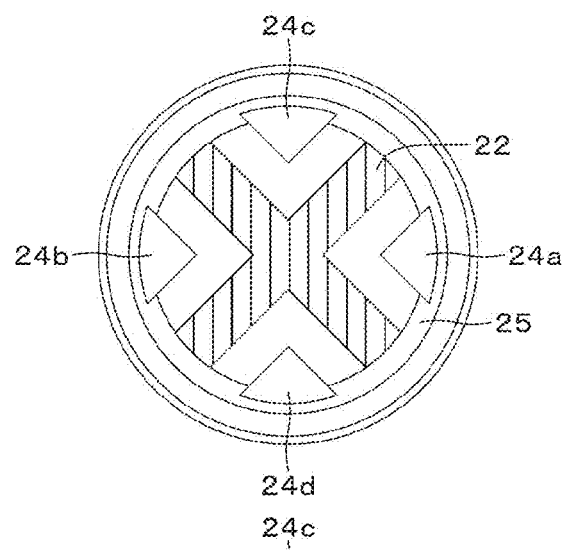
Figure 26C:
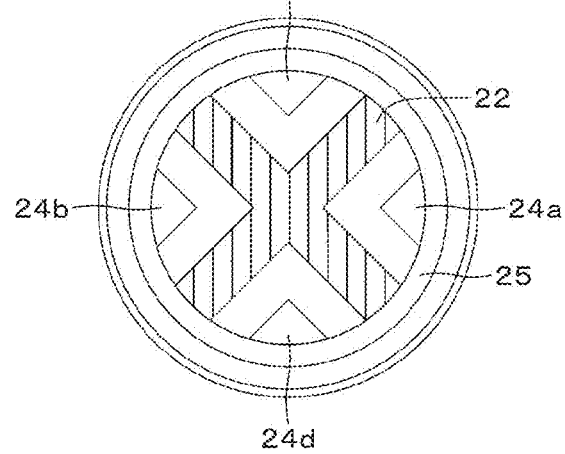

As illustrated in FIGS. 26B and 26C, the pusher 22 at the tip of the picker pusher is provided with plate-shaped protrusions having a cross shape, and the tip of each plate-shaped projection is tapered. In a case where the pusher 22 is inserted into the center hole of a picker finger 23 of the disc transport picker 15, the taper functions as a guide at the time of insertion.

The picker finger 23 of the disc transport picker 15 has a cylindrical shape having an outer diameter slightly smaller than the diameter of the center hole of the disc 5, and includes four claws 24a, 24b, 24c, and 24d (referred to as the claw 24 in a case where there is no need to distinguish individual claws) that freely protrude/retract at the same height position on the outer peripheral surface of the picker finger 23. The claw 24 is operated by the above picker drive unit 15a and picker mechanism unit 15b. Note that the number of claws 24 may be other than four.

FIGS. 26A and 26B illustrate a state in which the claw 24 protrudes outside the picker finger 23 (hereinafter, referred to as an opened state). In this state, for example, the claw 24 is in contact with a no-signal region (referred to as a clamping area) inside the lowermost disc 5 of the held discs 5. Therefore, the plurality of discs 5 in a stacked state is supported by the claws 24.

FIG. 26C illustrates a state where the claw 24 is retracted inside the picker finger 23 (hereinafter, referred to as a closed state). In this state, the disc 5 is not supported by the claws 24. The separated disc 5 is supported in contact with the flange of the pusher 22 below. In this case, the claw 24 is in an opened state at a position between the lowermost disc 5 and the other disc 5 on the next upper stage. Therefore, when the pusher 22 lowers, only the lowermost disc 5 is separated, and the disc 5 separated by the pusher 22 is supported.

As described above, the pusher 22 of the picker pusher is inserted into the center hole of the picker finger 23. The difference between the outer diameter of the pusher 22 and the inner diameter of the center hole of the picker finger 23 is reduced to reduce the gap between them. By arranging the pusher 22, it is possible to prevent the disc 5 from displacing laterally when the claws 24 operate. Therefore, it is possible to prevent the disc from being removed and falling from the claws 24 while the plurality of stacked discs that is laterally displaced is transported by the disc transport picker 15. Moreover, since the four claws 24 at the same height position operate synchronously, opening and closing control of the claws can be simplified as compared to the case where two types of claws are provided at different height positions and the two types of claws are operated separately.

"Disc Removal by the Disc Transport Picker"

The disc 5 loaded in the drive 13 described above has been taken out from the disc tray 1 on the turntable 16 by the disc transport picker 15. Hereinafter, the removal of the disc from the disc tray will be described with reference to FIG. 27, FIG. 28, and FIG. 29. The tip of the picker finger 23 as the disc support of the disc transport picker 15 is brought into contact with the tip of the center pole 4. As a result, even when the stack body of the discs 5 is pushed out above the disc tray 1, the stack body is held.

Figure 27:
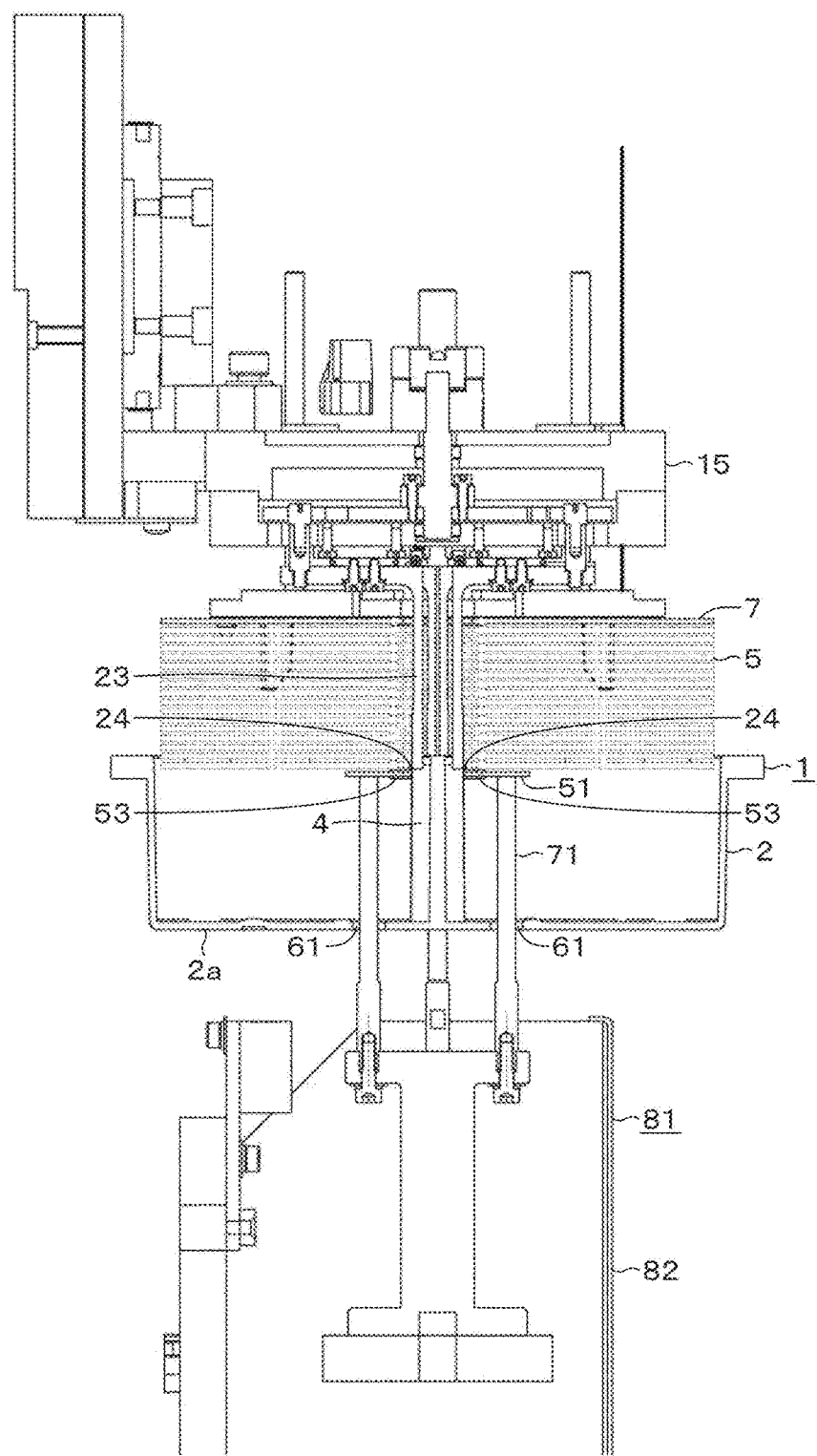
FIG. 27 is a sectional view illustrating a configuration for taking out a disc from a disc tray by a disc pushing pusher and a disc transport picker.
Figure 28:
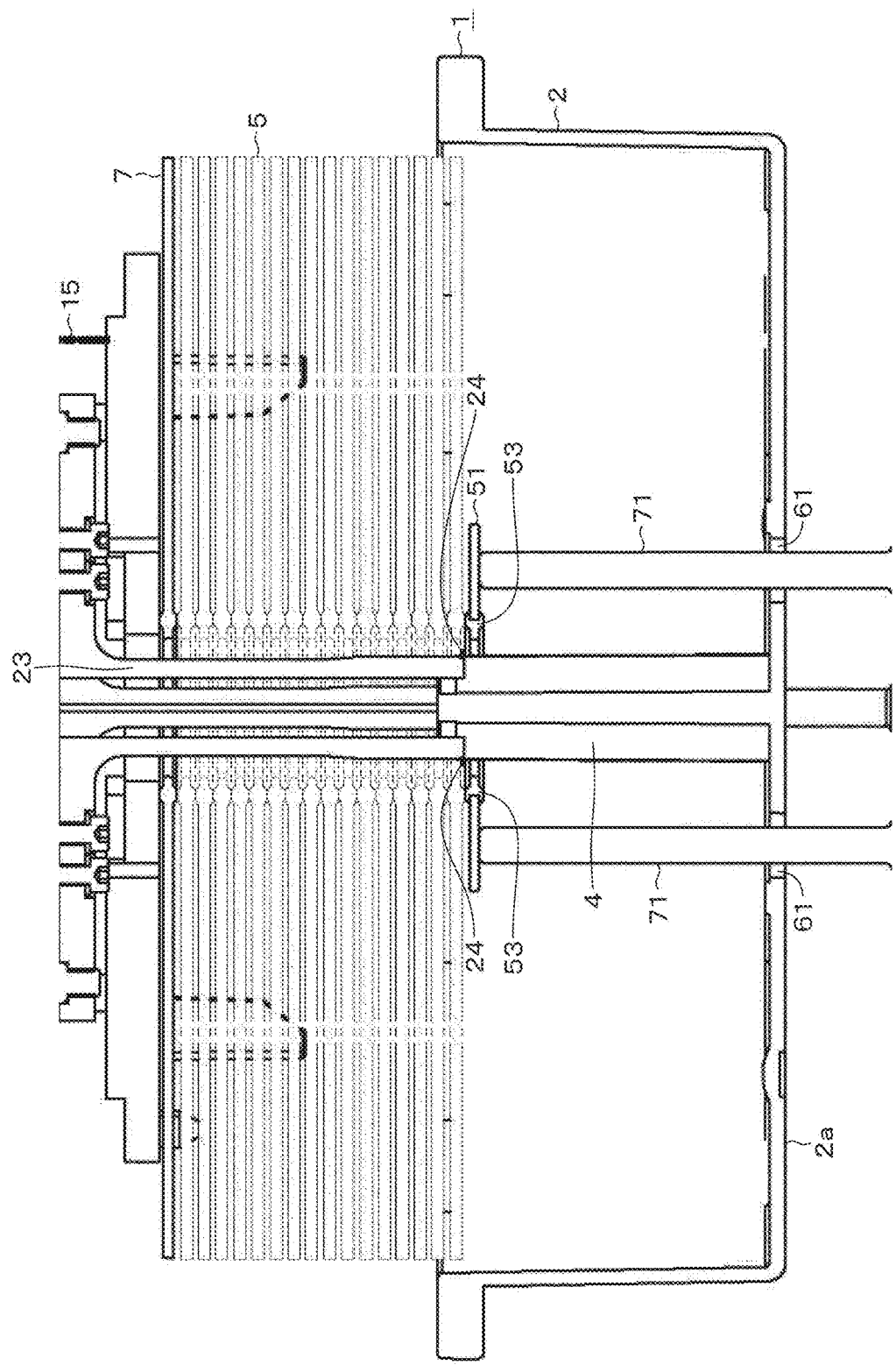
FIG. 28 is a partially enlarged view of FIG. 27.
Figure 29:
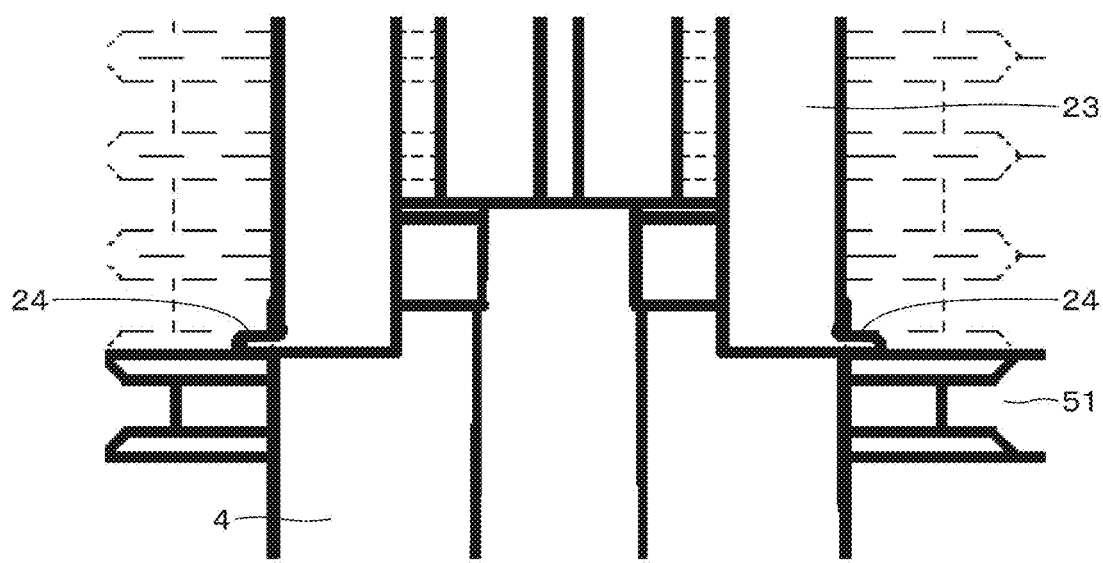
FIG. 29 is a partially enlarged view of FIG. 28.

As illustrated in FIG. 27, the disc pushing pusher 81 is located below the disc tray 1. When the disc removal operation is started, the disc pushing pusher 81 is raised by the actuator 83, the pin 71 is inserted into the disc tray 1 through the through-hole 61, and the spacer 51 and the tip of the pin 71 abut. Note that, in the disc tray 1, there are four rows of disc stack portions, and four pins 71 are provided for each row. FIG. 27 to FIG. 29 illustrate only one row of disc stack portions for the sake of simplicity.

The pin 71 further moves up to push up the spacer 51 and the stack body of the discs 5. This stack body is guided and raised by the center pole 4 of the disc tray 1 and the picker finger 23. In the example illustrated in the drawing, all the discs are taken out from the lowermost disc in the stack body. In this case, the stack body is raised to a position where the lowermost disc pops out from the upper surface of the case 2 of the disc tray 1.

When the stack body is raised to a predetermined position, the claws 24 are opened from the picker finger 23 of the disc transport picker 15, as illustrated in FIG. 28 and FIG. 29 in an enlarged manner. The claws 24 are opened between the upper surface of the spacer 51 and the clamping area of the lowermost disc 5.

Next, the disc pushing pusher 81 (pin 71) starts lowering. The pin 71 is attracted to the spacer 51 by the magnetic force of the magnet 71a at the tip, so that the pin 71 is lowered, and thus, even when the spacer 51 is stuck to the disc 5 due to static electricity, the spacer 51 can be reliably removed from the disc. Then, the spacer 51 lowers together with the pin 71. Thereafter, when the pin 71 is further lowered, the spacer 51 that has been attracted to the pin 71 comes off, and the pin 71 is pulled out of the disc tray 1, but the spacer 51 remains in the disc tray 1.

As described above, the picker finger 23 as the disc holding unit of the disc transport picker 15 and the center pole 4 are continuously connected to guide the stack body of the discs 5, and furthermore the disc to be taken out by the amount pushed up by the pin 71 of the disc pushing pusher 81 can be selected.

2. An Embodiment of the Present Technology

According to the present technology, the above-described disc archive device is to reliably prevent the disc tray 1 from popping out and falling from the tray rack 11 even in a case where the disc tray 1 stored in the tray rack 11 undergoes large oscillation or vibration such as a large earthquake. For this reason, the tray rack 11 is provided with a shutter for preventing the disc tray 1 from popping out.

Figure 30:
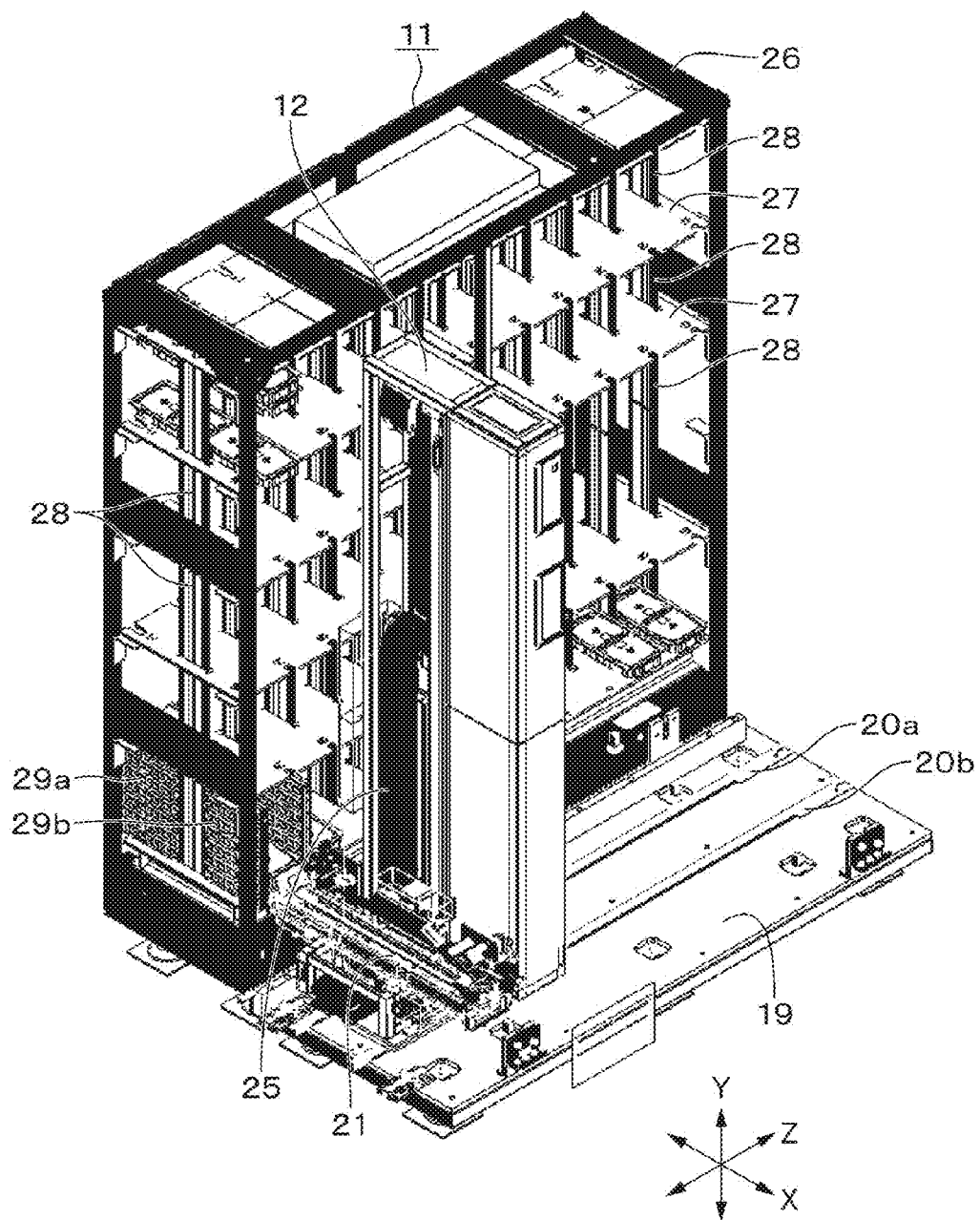
FIG. 30 is a perspective view illustrating a part of the entire configuration of an embodiment of the present technology.
Figure 31:
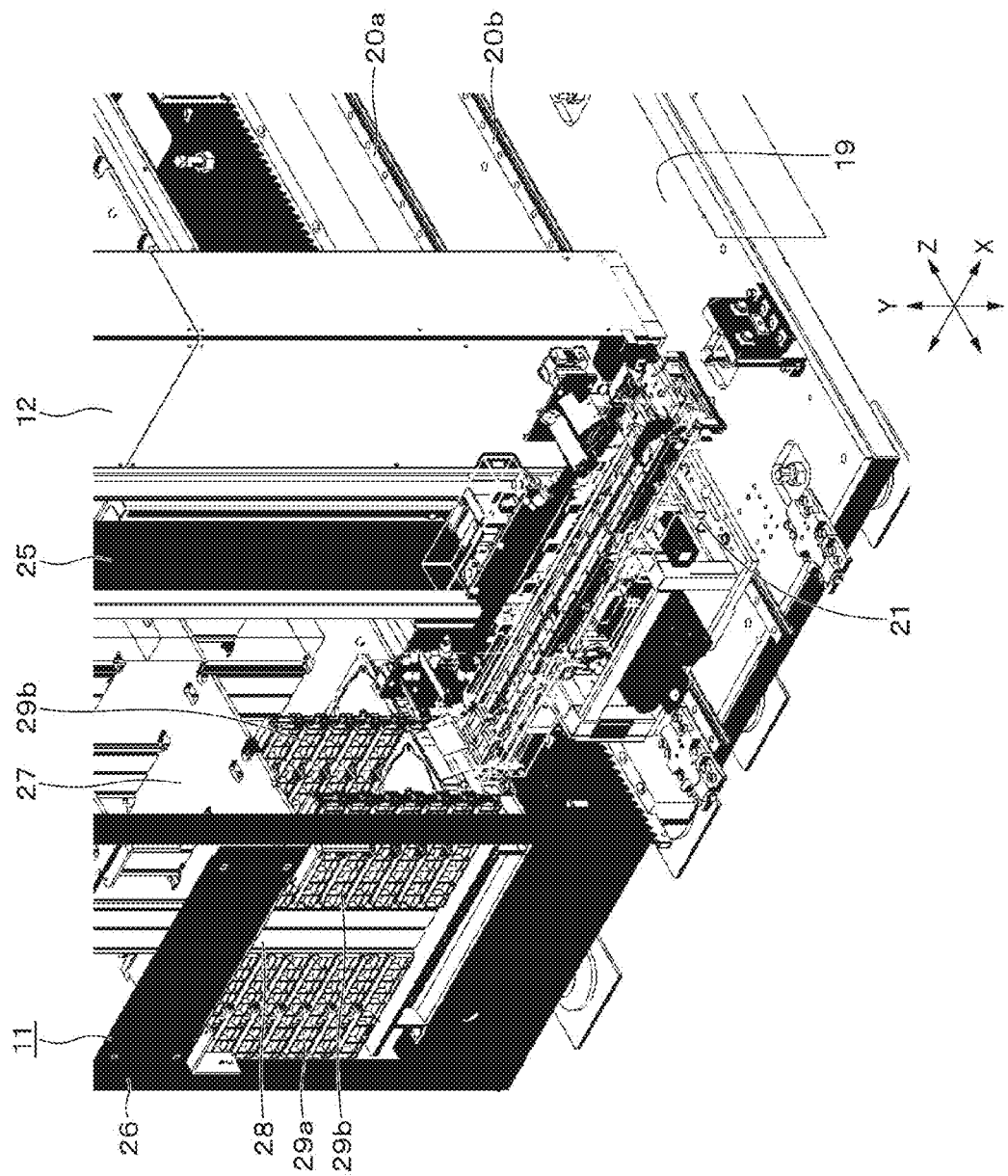
FIG. 31 is a partially enlarged view of FIG. 30.

FIG. 30 is a perspective view illustrating a more specific configuration example of the tray rack 11 and the tray transport robot 12, and FIG. 31 is an enlarged perspective view of a part thereof. FIG. 30 and FIG. 31 illustrate a configuration similar to a part of the entire configuration described with reference to FIG. 1 to FIG. 3. That is, a configuration excluding the tray rack 11, the disc drive 13, the disc transport picker 15, and the turntable 16 on one side in the overall configuration described with reference to FIG. 1 to FIG. 3 is illustrated. The tray transport robot 12 is slidable in the Z direction by guide rails 20a and 20b on a support base 19.

The tray transport robot 12 includes a tray placement unit 21 that pulls out the disc tray 1 from the tray rack 11 and places the pulled out tray rack 11 thereon, and an elevating mechanism 25 for displacing the tray placement unit 21 in the up-and-down direction (Y direction). A desired disc tray 1 of the tray rack 11 can be accessed by the sliding operation in the Z direction and the elevating operation in the Y direction of the tray transport robot 12.

The tray rack 11 includes, as an example, a frame 26 constituting an entire outer frame, a top plate and a bottom plate attached to the frame 26, upper and lower partition plates 27 forming an accommodation space, and left and right side plates. The side plates are formed by attaching side plates 29a and 29b including a synthetic resin to a metal column 28. The side plate 29a is located on the back side of the column 28, and the side plate 29b is located on the front side of the column 28. These side plates 29a and 29b are resin molded articles, and include a large number of ribs for maintaining the strength. Because a door is provided on the back side of the tray rack 11, the door can prevent the disc tray 1 from popping out of the tray rack 11. On the other hand, there is no door on the front side, and the tray transport robot 12 pulls out or pushes in the disc tray 1.

Figure 32:
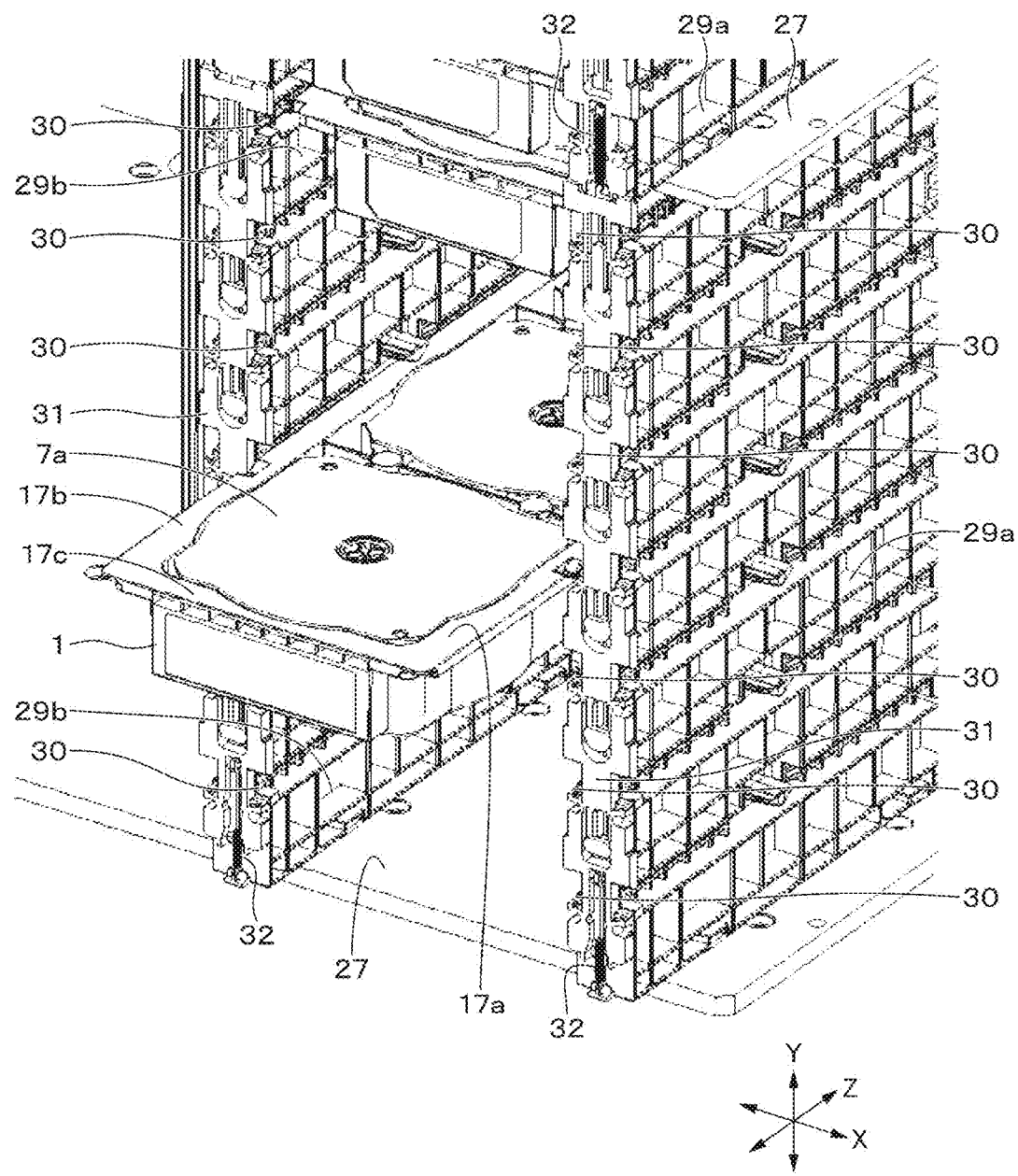
FIG. 32 is an enlarged perspective view of a part of an embodiment of the present technology.

As illustrated in FIG. 32, one accommodation space of the tray rack 11 can accommodate up to seven stages of disc trays 1 in the vertical direction. The illustrated example illustrates a state where, for example, the disc tray 1 is stored in the first (top) and fourth stages from the top, and the fourth stage disc tray 1 is partially pulled out.

As described with reference to FIGS. 8, 9A, and 9B, the disc tray 1 includes projections 17a, 17b, 17c, and 17d that protrude outward from the upper four edges of the case 2. On the other hand, the side plate 29*b* is provided with seven guide grooves 30 that function as guide portions. The guide groove 30 extends in the sliding direction of the disc tray 1. The projections 17*a* and 17*b* of the disc tray 1 are guided by the guide grooves 30, and the disc tray 1 slides in the accommodation space while being suspended by the projections 17*a* and 17*b*.

In this embodiment, the guide groove 30 is configured by a plurality of plate-shaped protrusions protruding from the surface of the side plate 29*b*. The projections 17*a* and 17*b* of the disc tray 1 are slidably supported by the plate-shaped protrusions. If necessary, a plate-shaped protrusion for supporting the bottom surface of the disc tray 1 may be provided on the side plate 29*b*. Moreover, the guide groove 30 may be formed as a groove having a recessed shape in cross-section in the inner surface of the side plate.

Figure 33B:
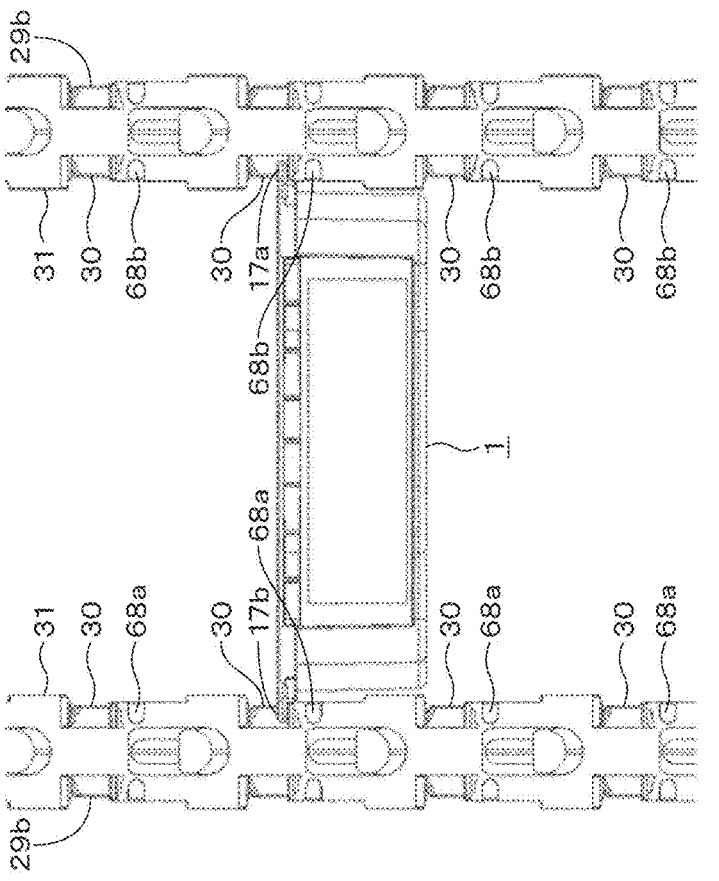
FIG. 33B is a front view illustrating an opened state of a shutter.
Figure 33A:
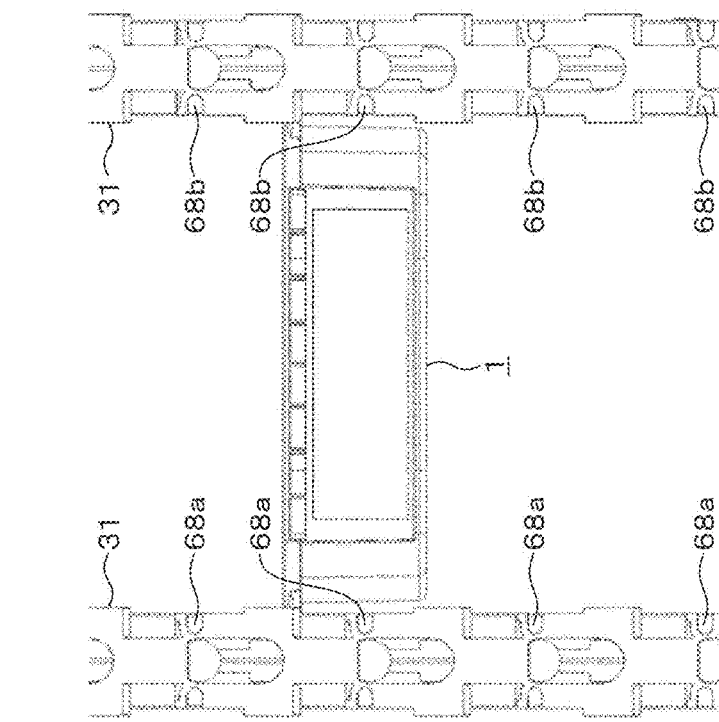
FIG. 33A is a front view illustrating a closed state of a shutter.

A plate-shaped shutter 31 is slidably attached to the front end surface of the side plate 29*b* in the up-and-down direction (Y direction). The shutters 31 are provided with respect to each accommodation space, and a pair of shutters 31 is provided for seven-stage accommodation portions in one accommodation space. FIG. 33A illustrates the closed state of the shutters 31, and FIG. 33B illustrates the opened state of the shutters 31.

Figure 34C:
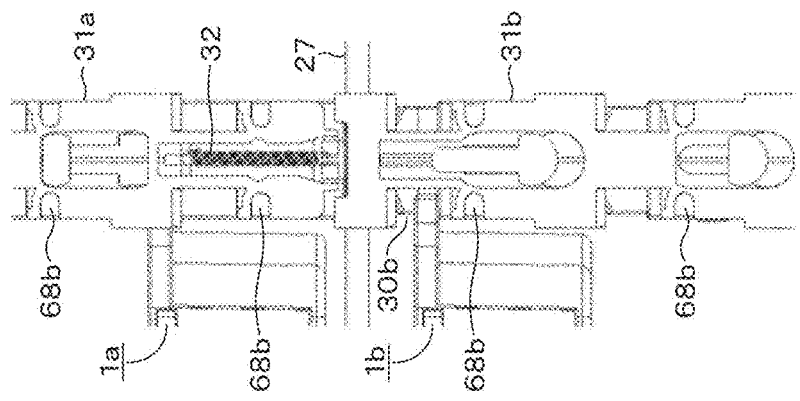
FIG. 34C is a partially enlarged view illustrating an upper shutter in a closed state and a lower shutter in an opened state.
Figure 34B:
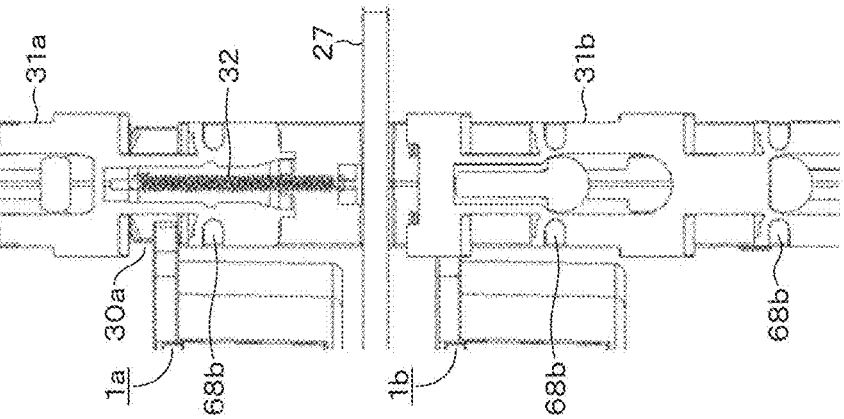
FIG. 34B is a partially enlarged view illustrating an upper shutter in an opened state and a lower shutter in a closed state.
Figure 34A:
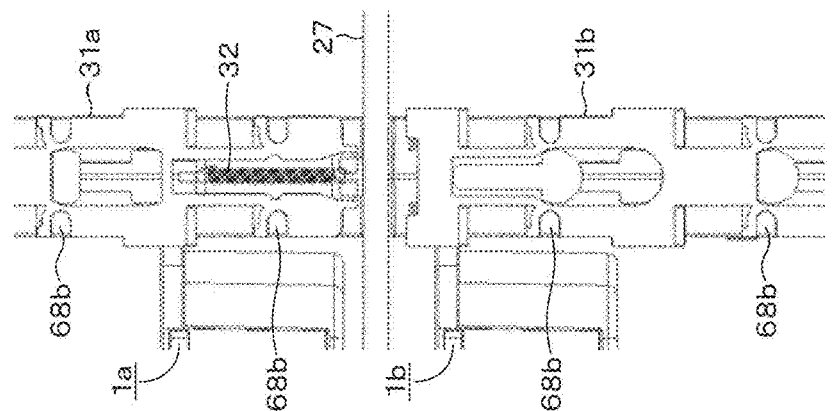
FIG. 34A is a partially enlarged view illustrating both an upper shutter and a lower shutter in a closed state.

Moreover, FIGS. 34A, 34B, and 34C illustrate a part of the upper and lower accommodation spaces located across the partition plate 27. FIG. 34A illustrates both an upper shutter 31*a* and a lower shutter 31*b* in the closed state, and end face openings of a guide groove 30*a* of the upper accommodation space and a guide groove 30*b* of the lower accommodation space are respectively covered by the upper shutter 31*a* and the lower shutter 31*b*. Therefore, the disc trays 1*a* and 1*b* are prevented from popping out of the accommodation space. FIG. 34B illustrates the upper shutter 31*a* in the opened state and the lower shutter 31*b* in the closed state, an end face opening of the guide groove 30*a* of the upper accommodation space is exposed, and an end face opening of the guide groove 30*b* of the lower accommodation space is covered by the lower shutter 31*b*. FIG. 34C illustrates the upper shutter 31*a* in the closed state and the lower shutter 31*b* in the opened state, an end face opening of the guide groove 30*a* of the upper accommodation space is covered by the upper shutter 31*a*, and an end face opening of the guide groove 30*b* of the lower accommodation space is exposed. In this manner, the shutter 31 (31*a*, 31*b*) can prevent the disc tray 1 from popping out in the closed state in which the front opening of the guide groove 30 is covered. When the disc tray 1 is pulled out or pushed in, the disc tray 1 is in the opened state in which the front opening of the guide groove 30 is exposed.

The shutter 31 is normally brought into the closed state by an elastic body such as a coil spring 32. As illustrated in FIGS. 32, 33A, and FIG. 33B, the coil spring 32 is provided between the lower end of the shutter 31 and a fixed portion (for example, the end of the side plate 29*b*), and constantly generates a downward spring force that keeps the shutter 31 in the closed state. The position of the shutter 31 is regulated at the position where the lower end of the shutter 31 contacts the protrusion formed on the end surface of the side plate 29*b*. At this position, as illustrated in FIGS. 32, 34A, 34B, and 34C, the shutter 31 is brought into the closed state in which the end face opening of the guide groove 30 is covered by the shutter 31.

By raising the shutter 31 against the spring force of the coil spring 32, as illustrated in FIGS. 32, 34A, 34B, and 34C, the end face opening of the guide groove 30 is exposed, and the shutter 31 is brought into the opened state. The upper end of the shutter 31 is raised, for example, to a position where it contacts the lower end of the upper shutter 31. The amount of displacement of this rise is sufficient to expose the end face opening of the guide groove 30.

Figure 35:
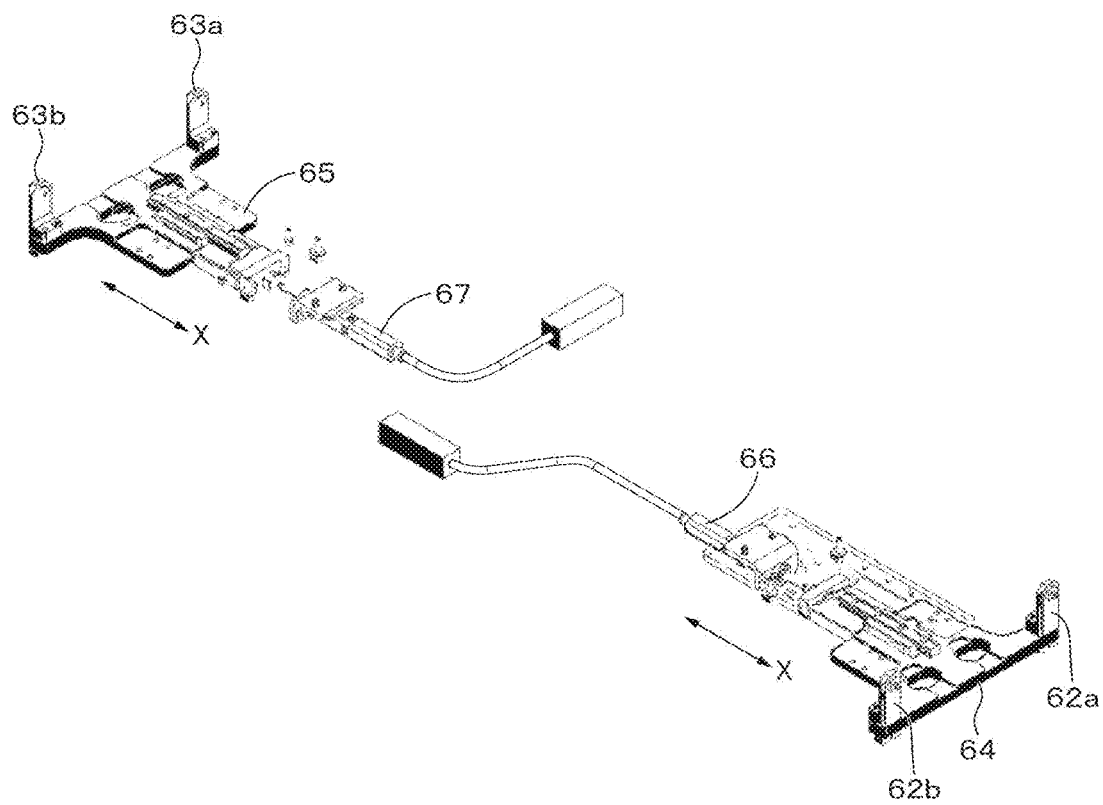
FIG. 35 is a perspective view illustrating a mechanism for displacing a shutter link pin.

In order to open and close the shutter 31, an elevating operation of the elevating mechanism 25 (see FIG. 30 and FIG. 31) of the tray transport robot 12 is used. A mechanism for sliding shutter link pins 62*a*, 62*b*, 63*a*, and 63*b* as illustrated in FIG. 35 is provided below the surface of the tray placement unit 21 on which the disc tray 1 is placed. The shutter link pins 62*a* and 62*b* are fixed to a mounting plate vertically erected from a movable base 64, and the shutter link pins 63*a* and 63*b* are fixed to a mounting plate vertically erected from a movable base 65.

The movable bases 64 and 65 are attached to operating shafts of electric cylinders (also referred to as robo cylinders) 66 and 67, and slide the movable bases 64 and 65 in the direction of the arrow (X direction) in FIG. 35. The electric cylinders 66 and 67 have a ball screw, an AC servomotor, and the like, and perform an extension and contraction operation of the shaft. Note that a different power source such as an air cylinder may be used instead of the electric cylinders 66 and 67.

When the electric cylinders 66 and 67 operate, the shutter link pins 62*a* to 63*b* protrude forward and fit into link recesses, holes, or notches formed on the shutter 31. As illustrated in FIGS. 33A, 33B, 34A, 34B, and 34C, the shutter 31 includes link notches 68*a* and 68*b*. The shutter 31 illustrated in FIG. 32 similarly includes a notch, but reference numerals for the notch are omitted to prevent the drawing from being difficult to see.

For example, in FIG. 33A, the shutter link pin 62*a* is fitted into the notch 68*a*, and the shutter link pin 62*b* is fitted into the notch 68*b*. Then, when the tray placement unit 21 is raised by the elevating mechanism 25 of the tray transport robot 12, the shutter 31 is raised and brought into the opened state as illustrated in FIG. 33B. On the other hand, when the tray placement unit 21 is lowered by the elevating mechanism 25, the shutter 31 is lowered and returns to the closed state as illustrated in FIG. 33A. Moreover, also in a case where the electric cylinders 66 and 67 operate and retract the shutter link pins 62*a* and 62*b*, the fitted state of the shutter link pins 62*a* and 62*b* and the notches 68*a* and 68*b* is released, and the shutter 31 is lowered by the spring force of the coil spring 32 and returns to the closed state illustrated in FIG. 33A.

An operation of controlling the shutter 31 according to an embodiment of the present technology will be described with reference to FIGS. 36A, 36B, 37A, 37B, 38A, 38B, 39A, 39B, 40A, and 40B. Note that the following description is schematic. In the drawings and the specification, the locking claws 47*a* and 47*b* are simply referred to as the locking claws 47, the shutter link pins 62*a* and 62*b* are simply referred to as the shutter link pins 62, and the link notches 68*a* and 68*b* are simply referred to as the notches 68.

"Operation at the Time of Pulling Out the Disc Tray 1"

In order to pull out the disc tray 1 accommodated in the accommodation space provided in the tray rack 11, the shutter link pin 62 approaches from the front surface of the accommodation space (FIG. 36A). Then, the shutter link pin 62 is fitted into the notch 68 of the shutter 31 (FIG. 36B). At this time, the locking claw 47 of the tray transport robot 12 approaches from the front surface together with the tray placement unit 21.

The locking claw 47 enters the accommodation space and is located below a space 18 on the front surface of the disc tray 1 (FIG. 37A). Next, the locking claw 47 is raised by the elevating mechanism 25 of the tray transport robot 12, and the tip of the locking claw 47 enters the space 18 (FIG. 37B). Since the locking claw 47 is raised while the fitting state of the locking claw 47 and the notch 68 is maintained, the shutter 31 is raised and the shutter 31 is brought into the opened state.

FIG. 38A illustrates the shutter opened state as in FIG. 37B. From this state, the locking claw 47 is further raised, and as illustrated in FIG. 38B, the front end of the disc tray 1 is slightly lifted up. Thus, lifting the front end of the disc tray 1 a small amount is necessary to get over the step provided near the front end of the guide groove 30 of the side plate 29b. The step is provided to prevent the disc tray 1 from easily popping out due to a slight vibration or the like.

Then, the disc tray 1 is pulled out of the accommodation space as illustrated in FIG. 39A by the retreat of the locking claw 47. FIG. 39B illustrates a state where the disc tray 1 is completely pulled out. Until the pulling out of the disc tray 1 is completed, the fitting state of the shutter link pin 62 and the notch 68 continues, and the shutter 31 is kept in the opened state.

After the pulling out of the disc tray 1 is completed, the shutter link pin 62 is lowered by the elevating mechanism 25 of the tray transport robot 12, and the shutter 31 is also lowered by the spring force of the coil spring 32 (FIG. 40A). As illustrated in FIG. 40B, the shutter link pin 62 is lowered until the shutter 31 is in a position of the closed state. Thereafter, the shutter link pin 62 retreats, and the fitting state of the shutter link pin 62 and the notch 68 is released. When the fitting state between the shutter link pin 62 and the notch 68 is released, the closed state of the shutter 31 is reliably held by the spring force of the coil spring 32.

"Operation at the Time of Pushing the Disc Tray 1"

An operation at the time of inserting the disc tray 1 into the accommodation space will be described. First, the shutter link pin 62 is inserted into the notch 68, and next the shutter 31 is lifted up by the elevating mechanism 25, and the shutter 31 is brought into the opened state. Then, the disc tray 1 is pushed into the accommodation space by a locking claw opposite to the locking claw 47.

When the operation of accommodating the disc tray 1 is completed, the tray placement unit 21 is lowered by the elevating mechanism 25. After lowering, the shutter link pin 62 is pulled into the initial position, and the fitting state of the shutter link pin 62 and the notch 68 is released. As a result, the shutter 31 is brought into the closed state.

As described above, in an embodiment of the present technology, other than the time when the disc tray 1 is pulled out from the tray rack 11 and the disc tray 1 is inserted into the tray rack 11, the shutter 31 is closed. Therefore, even in a case where a large vibration is applied to the tray rack 11 due to, for example, a large earthquake, the disc tray 1 can be prevented from popping out of the tray rack 11. Furthermore, by reliably preventing the disc tray 1 from popping out, it is not necessary to provide a sensor for detecting the disc tray 1 popping out. For example, it is not necessary to provide a sensor for each vertical row. Eliminating the need for a sensor enables cost reduction and avoids a drop in reliability due to sensor failure. Moreover, as in an embodiment of the present technology, since the elevating operation of the elevating mechanism 25 of the tray transport robot 12 is used to open and close the shutter 31, the configuration can be simplified.

3. Variation

Heretofore, the embodiments of the present technology have been described in detail, but the present technology is not limited to the aforementioned embodiments, but various modifications based on the technical idea of the present technology may be made. Furthermore, the configurations, methods, steps, shapes, materials, numerical values, and the like of the above-described embodiments can be combined with each other without departing from the gist of the present technology.

Note that the present technology may be configured as below.

(1)

A disc storage device rack including:
an accommodation space surrounded by left and right side plates and upper and lower partition plates and configured to accommodate a disc storage device;
a guide portion provided on each of the side plates and configured to fit to a guided unit provided in the disc storage device to guide a sliding operation of the disc storage device; and
a shutter provided on each end surface of the side plates so as to be slidable in an up-and-down direction and configured to open an opening of the guide portion when the disc storage device is pulled out from the accommodation space or when the disc storage device is pushed into the accommodation space.

(2)

The disc storage device rack according to (1), in which the guided unit is a projection protruding laterally from a side surface of a case of the disc storage device.

(3)

The disc storage device rack according to (1), in which the guide portion is a guide groove extending in a sliding direction of the disc storage device, and the shutter opens and closes an opening of an end surface of the guide groove.

(4)

The disc storage device rack according to (3), in which the guide groove is configured by a protrusion provided on the side plate.

(5)

The disc storage device rack according to (1), in which a locking unit is provided on the shutter, a pin is fitted to the locking unit, and the shutter is opened and closed when the pin moves up and down.

(6)

The disc storage device rack according to (1), further including an elastic body that constantly displaces the shutter downward to close an opening of the guide groove.

(7)

A disc archive device including:
a disc storage device rack including an accommodation space surrounded by left and right side plates and upper and lower partition plates and configured to accommodate a disc storage device, a guide portion provided on each of the side plates and configured to fit to a guided unit provided in the disc storage device to guide a sliding operation of the disc storage device, and a shutter provided on each end surface of the side plates so as to be slidable in an up-and-down direction and configured to open an opening of the guide portion when the disc storage device is pulled out from the accommodation space or when the disc storage device is pushed into the accommodation space;
a transport robot arranged near the accommodation space of the disc storage device rack and configured to pull out the disc storage device from the accommodation space and push the disc storage device into the accommodation space; and a disc drive having a plurality of drives for performing recording or reproduction on a disc-shaped recording medium in the disc storage device transported by the transport robot.

(8)

The disc archive device according to (7), in which a locking unit is provided on the shutter, a pin protruding from the transport robot is fitted to the locking unit, and the shutter is opened and closed when the pin moves up and down.

REFERENCE SIGNS LIST

1 Disc tray
2 Case
5 Disc
6 Film
11 Tray rack
12 Tray transport robot
13 Disc drive
13*a* Drive tray
15 Disc transport picker
16 Turntable
17 Projection
21 Tray placement unit
22 Drive loading pusher
24*a* to 24*d* Claw
25 Elevating mechanism
29*a*, 29*b* Side plate
30 Guide groove
31 Shutter
32 Coil spring
47*a*, 47*b*, 48*a*, 48*b* Locking claw
62*a*, 62*b*, 63*a*, 63*b* Shutter link pin
68*a*, 68*b* Link notch

The invention claimed is:

1. A disc storage device rack, comprising:
    an accommodation space surrounded by left and right side plates and upper and lower partition plates and configured to accommodate a disc storage device;
    a guide portion provided on each of the left and right side plates and configured to fit to a guided unit provided in the disc storage device to guide a sliding operation of the disc storage device; and
    a shutter provided on each end surface of the left and right side plates so as to be slidable in an up-and-down direction and configured to open an opening of the guide portion when the disc storage device is pulled out from the accommodation space or when the disc storage device is pushed into the accommodation space.

2. The disc storage device rack according to claim 1, wherein the guided unit is a projection protruding laterally from a side surface of a case of the disc storage device.

3. The disc storage device rack according to claim 1, wherein the guide portion is a guide groove extending in a sliding direction of the disc storage device, and the shutter opens and closes an opening of an end surface of the guide groove.

4. The disc storage device rack according to claim 3, wherein the guide groove is configured by a protrusion provided on the right side plate.

5. The disc storage device rack according to claim 1, wherein a locking unit is provided on the shutter, a pin is fitted to the locking unit, and the shutter is opened and closed when the pin moves up and down.

6. The disc storage device rack according to claim 1, further comprising an elastic body that constantly displaces the shutter downward to close an opening of a guide groove.

7. A disc archive device, comprising:
    a disc storage device rack including an accommodation space surrounded by left and right side plates and upper and lower partition plates and configured to accommodate a disc storage device, a guide portion provided on each of the left and right side plates and configured to fit to a guided unit provided in the disc storage device to guide a sliding operation of the disc storage device, and a shutter provided on each end surface of the left and right side plates so as to be slidable in an up-and-down direction and configured to open an opening of the guide portion when the disc storage device is pulled out from the accommodation space or when the disc storage device is pushed into the accommodation space;
    a transport robot arranged near the accommodation space of the disc storage device rack and configured to pull out the disc storage device from the accommodation space and push the disc storage device into the accommodation space; and
    a disc drive having a plurality of drives for performing recording or reproduction on a disc-shaped recording medium in the disc storage device transported by the transport robot.

8. The disc archive device according to claim 7, wherein a locking unit is provided on the shutter, a pin protruding from the transport robot is fitted to the locking unit, and the shutter is opened and closed when the pin moves up and down.

* * * * *